United States Patent
Iwasaki et al.

(10) Patent No.: US 9,834,908 B2
(45) Date of Patent: Dec. 5, 2017

(54) WORK MACHINE AND CONTROL METHOD FOR WORK MACHINE

(71) Applicant: Komatsu Ltd., Tokyo (JP)

(72) Inventors: Yoshiro Iwasaki, Naka-gun (JP); Masashi Ichihara, Hiratsuka (JP)

(73) Assignee: Komatsu Ltd., Tokyo (JP)

( * ) Notice: Subject to any disclaimer, the term of this patent is extended or adjusted under 35 U.S.C. 154(b) by 0 days.

(21) Appl. No.: 15/102,648

(22) PCT Filed: Nov. 19, 2015

(86) PCT No.: PCT/JP2015/082632
§ 371 (c)(1),
(2) Date: Jun. 8, 2016

(87) PCT Pub. No.: WO2016/056678
PCT Pub. Date: Apr. 14, 2016

(65) Prior Publication Data
US 2017/0145662 A1    May 25, 2017

(51) Int. Cl.
| | |
|---|---|
| G06F 7/70 | (2006.01) |
| G06F 19/00 | (2011.01) |
| G06G 7/00 | (2006.01) |
| G06G 7/76 | (2006.01) |
| E02F 9/22 | (2006.01) |
| E02F 9/26 | (2006.01) |
| E02F 9/18 | (2006.01) |
| E02F 3/32 | (2006.01) |

(52) U.S. Cl.
CPC ............. *E02F 9/2267* (2013.01); *E02F 9/18* (2013.01); *E02F 9/265* (2013.01); *E02F 3/32* (2013.01); *G05B 2219/45012* (2013.01)

(58) Field of Classification Search
CPC ..... E02F 9/18; E02F 9/22; E02F 9/265; E02F 9/2214; E02F 3/32; E02F 9/2217;
(Continued)

(56) References Cited

U.S. PATENT DOCUMENTS

| 8,511,490 B2 | 8/2013 | Kawai et al. |
| 9,464,406 B2 | 10/2016 | Matsuyama et al. |

(Continued)

FOREIGN PATENT DOCUMENTS

| CN | 101863424 A | 10/2010 |
| CN | 102484441 A | 5/2012 |

(Continued)

OTHER PUBLICATIONS

International Search Report dated Jan. 19, 2016, issued for PCT/JP2015/082632.

*Primary Examiner* — Rachid Bendidi
(74) *Attorney, Agent, or Firm* — Locke Lord LLP

(57) ABSTRACT

A control method for a work machine, includes: detecting a posture of a working unit driven by a hydraulic cylinder in a movable range; determining whether the working unit at a stop position of the movable range has started moving based on an operation of the working unit; setting a deceleration section including an end position of the movable range and a deceleration ratio of the working unit in the deceleration section, based on the posture of the working unit in a stopped state at the stop position, and a threshold determined in advance; and outputting a command signal to a control valve, which is capable of adjusting an amount of a working oil supplied to the hydraulic cylinder, such that the working unit moves from the stop position to the end position based on the deceleration section and the deceleration ratio.

8 Claims, 11 Drawing Sheets

(58) Field of Classification Search
CPC ..... E02F 9/2296; E02F 9/2033; E02F 9/2035; E02F 9/2285; E02F 9/367; E02F 9/2292; E02F 9/2203; E02F 9/2235; E02F 9/2246; E02F 9/2029; E02F 9/2042; E02F 9/2228; E02F 9/00; G05B 2219/45012; B25J 9/1664; B25J 9/1612; F15B 21/087; F15B 2211/755; F15B 2211/6656; F15B 2211/6336
See application file for complete search history.

(56) References Cited

U.S. PATENT DOCUMENTS

2009/0319133 A1* 12/2009 Ekvall ............... E02F 9/2029 701/50
2010/0264106 A1 10/2010 Kawai et al.
2013/0011233 A1 1/2013 Watanabe et al.
2013/0297155 A1* 11/2013 Ekvall ............... E02F 9/2029 701/50
2016/0097184 A1 4/2016 Matsuyama et al.

FOREIGN PATENT DOCUMENTS

| | | | |
|---|---|---|---|
| CN | 103890273 A | | 6/2014 |
| JP | 03-241124 A | | 10/1991 |
| JP | 08-035239 A | | 2/1996 |
| JP | 2574050 B2 | | 1/1997 |
| JP | 2000-199243 A | | 7/2000 |
| JP | 2011-157789 A | | 8/2011 |
| JP | 2011188757 A | * | 9/2011 |

\* cited by examiner

WORK MACHINE AND CONTROL METHOD FOR WORK MACHINE

FIELD

The present invention relates to a work machine and a control method for a work machine.

BACKGROUND

In the technical field relating to a work machine, a backhoe as disclosed in Patent Literature 1 has been known. The backhoe disclosed in Patent Literature 1 is provided with a cushion control device that gradually decelerates a boom by a predetermined deceleration characteristic set in advance near a raised end stop position in a raised posture, and automatically stops the boom at the raised end stop position in spite of the raising operation of the boom by an operation lever that operates the boom.

CITATION LIST

Patent Literature

Patent Literature 1: Japanese Laid-open Patent Publication No. 2000-199243

SUMMARY

Technical Problem

The backhoe disclosed in Patent Literature 1 is configured to stop a boom by operating an operation lever to a neutral position while the boom is decelerated by a deceleration characteristic of the cushion control device in the middle of a deceleration range. Thereafter, in order to activate the boom by the raising operation of the operation lever and to move the boom toward a raised end stop position, the backhoe is configured to slowly accelerate the boom until the velocity reaches a velocity based on the deceleration characteristic and then, to automatically stop the boom at the raised end stop position of the boom by gradually decelerating the boom in accordance with the deceleration characteristic when raising velocity of the boom reaches the velocity based on the deceleration characteristic. However, as in the related art, a method of slowly accelerating the boom until the velocity reaches a velocity based on the deceleration characteristic causes the movement of the boom to be excessively slow, and it takes time for the boom to move to the raised end stop position after being activated. Consequently, working efficiency of the work machine is reduced.

An aspect of the present invention has an object to provide a work machine and a control method for a work machine that can suppress the reduction in working efficiency.

Solution to Problem

According to a first aspect of the present invention, a work machine comprise: a hydraulic cylinder that drives a working unit in a movable range; a detection device that detects a posture of the working unit; an operation signal detection unit that detects an operation signal when the working unit is operated; a control valve capable of adjusting an amount of a working oil supplied to the hydraulic cylinder; a calculation unit that determines whether the working unit at a stop position in the movable range has started moving based on the operation signal detected by the operation signal detection unit; a setting unit that sets a deceleration section including an end position of the movable range and a deceleration ratio of the working unit in the deceleration section, based on the posture of the working unit in a stopped state at the stop position, and a threshold determined in advance; and a control unit that outputs a command signal to the control valve such that the working unit moves from the stop position to the end position based on the deceleration section and the deceleration ratio.

According to a second aspect of the present invention, a control method for a work machine, comprises: detecting a posture of a working unit driven by a hydraulic cylinder in a movable range; determining whether the working unit at a stop position of the movable range has started moving based on an operation of the working unit; setting a deceleration section including an end position of the movable range and a deceleration ratio of the working unit in the deceleration section, based on the posture of the working unit in a stopped state at the stop position, and a threshold determined in advance; and outputting a command signal to a control valve, which is capable of adjusting an amount of a working oil supplied to the hydraulic cylinder, such that the working unit moves from the stop position to the end position based on the deceleration section and the deceleration ratio.

Advantageous Effects of Invention

According to the aspect of the present invention, a work machine and a control method for a work machine that can suppress the reduction in working efficiency are provided.

DESCRIPTION OF EMBODIMENTS

In the following, an embodiment according to the present invention will be described with reference to the drawings;

however, the present invention is not limited to this embodiment. Components of the embodiment described below can be combined appropriately. Also, there may be a case where some of the components are not used.

[Work Machine]

Figure 1:
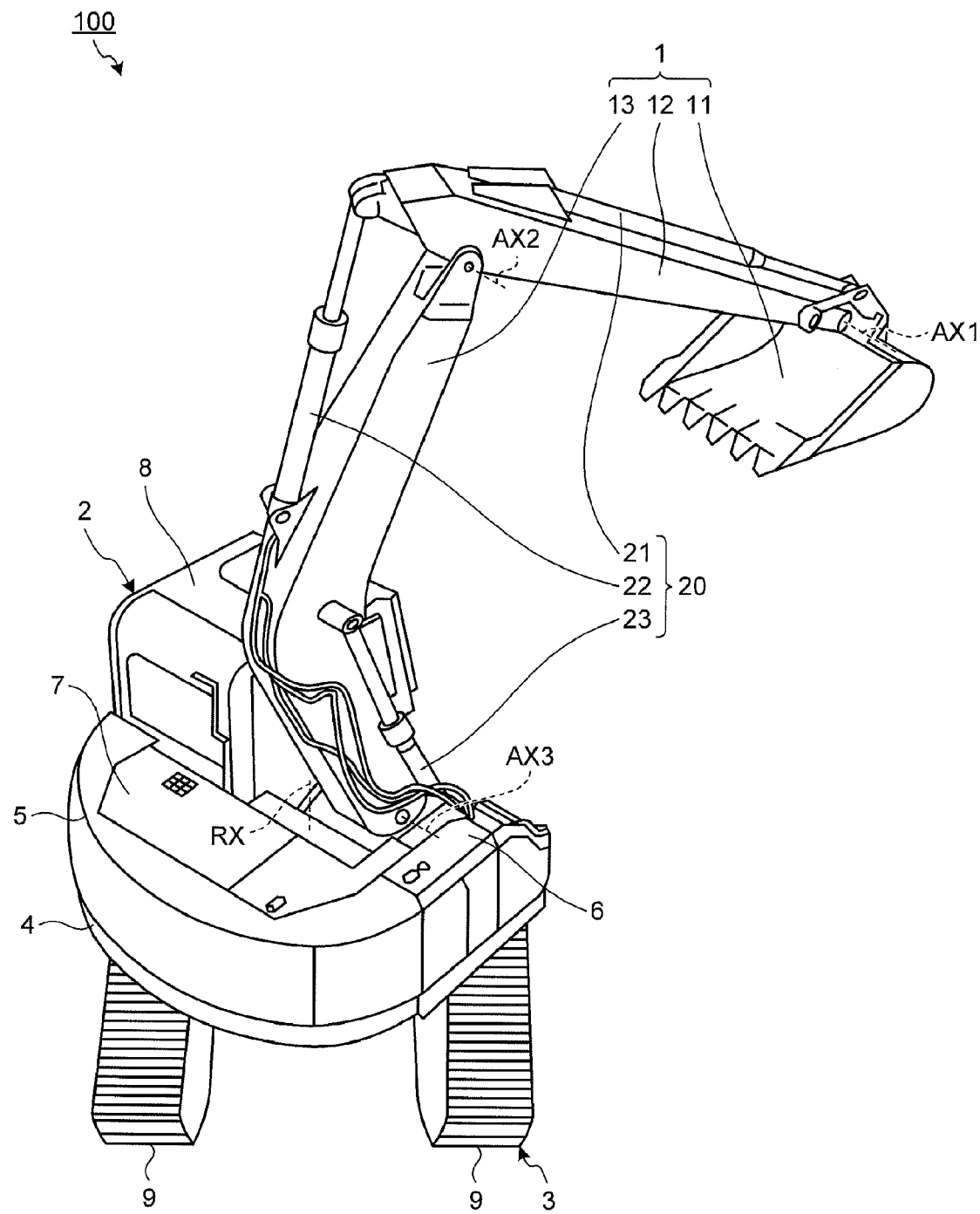
FIG. 1 is a perspective view illustrating an example of an excavator according to the present embodiment.
Figure 2:
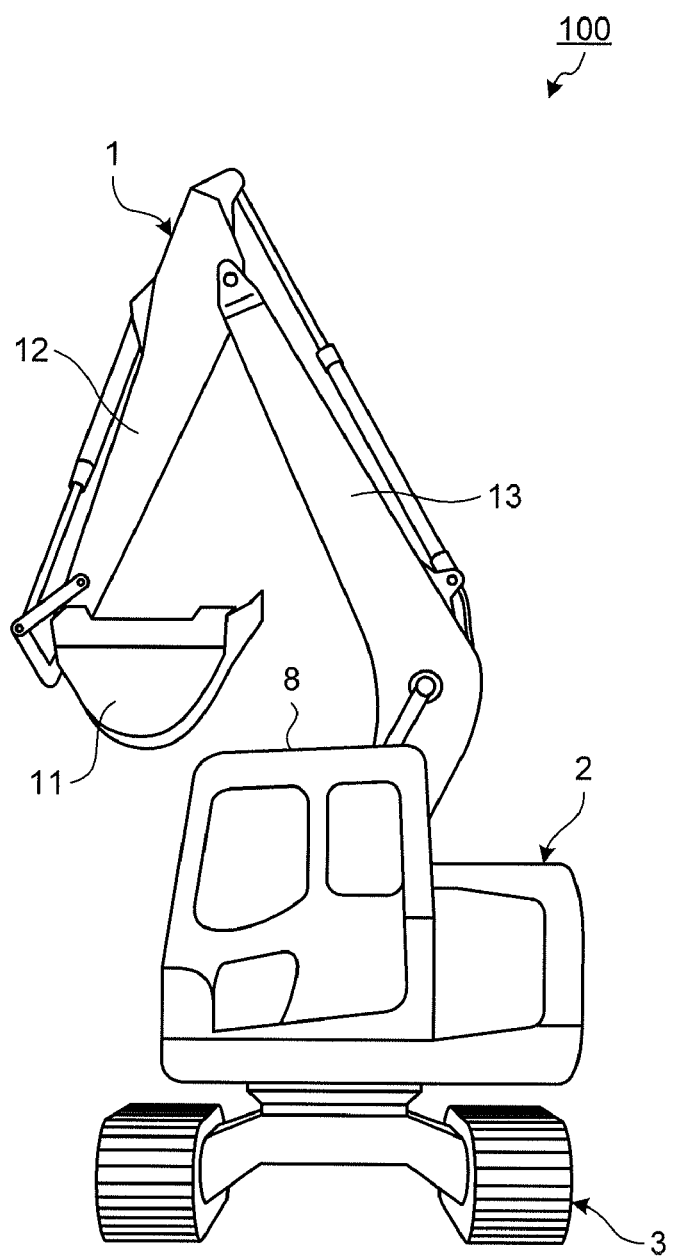
FIG. 2 is a side view illustrating an example of the excavator according to the present embodiment.

FIG. 1 is a perspective view illustrating an example of a work machine 100 according to the present embodiment. FIG. 2 is a side view illustrating an example of the work machine 100 according to the present embodiment. In the present embodiment, an excavator (backhoe) being an example of the work machine 100 will be described. In the following description, the work machine 100 is appropriately referred to as an excavator 100.

As illustrated in FIG. 1, the excavator 100 is provided with a working unit 1 actuated by hydraulic pressure, a hydraulic cylinder 20 that drives the working unit 1, an upper swing body 2 that supports the working unit 1, and a lower traveling body 3 that supports the upper swing body 2. The upper swing body 2 is swingable about a swing axis RX in a state of being supported by the lower traveling body 3.

The working unit 1 is supported by the upper swing body 2. The working unit 1 includes a bucket 11, an arm 12 coupled to the bucket 11, and a boom 13 coupled to the arm 12.

The bucket 11 and the arm 12 are coupled via a bucket pin. The bucket 11 is supported by the arm 12 to be rotatable around a rotation axis AX1. The arm 12 and the boom 13 are coupled via an arm pin. The arm 12 is supported by the boom 13 to be rotatable around a rotation axis AX2. The boom 13 and the upper swing body 2 are coupled via a boom pin. The boom 13 is supported by the upper swing body 2 to be rotatable around a rotation axis AX3.

The rotation axis AX1, the rotation axis AX2, and the rotation axis AX3 are parallel to one another. The rotation axes AX1, AX2, and AX3 are each orthogonal to an axis parallel to the swing axis RX. In the following description, the axial direction of the rotation axes AX1, AX2, and AX3 is appropriately referred to as the vehicle width direction of the upper swing body 2. Also, the direction orthogonal to both the rotation axes AX1, AX2, and AX3 and the swing axis RX is referred to as the front-rear direction of the upper swing body 2.

The hydraulic cylinder 20 drives the working unit 1 in a movable range of the working unit 1. The hydraulic cylinder 20 is driven by a supplied working oil. The hydraulic cylinder 20 includes a bucket cylinder 21 that drives the bucket 11, an arm cylinder 22 that drives the arm 12, and a boom cylinder 23 that drives the boom 13. The bucket 11 is rotatable around the rotation axis AX1 in a movable range of the bucket 11. The arm 12 is rotatable around the rotation axis AX2 in a movable range of the arm 12. The boom 13 is rotatable around the rotation axis AX3 in a movable range of the boom 13.

The upper swing body 2 includes a swing base 4, a counterweight 5, an equipment room 6, an engine room 7, and a cab 8 where an operator boards.

The swing base 4 is swingably supported by the lower traveling body 3. The swing base 4 constitutes a vehicle body frame of the excavator 100. The counterweight 5, the equipment room 6, the engine room 7, and the cab 8 are arranged on the swing base 4. The working unit 1 is attached to the swing base 4 in front of the equipment room 6.

The counterweight 5 is arranged behind the engine room 7. The counterweight 5 is formed by putting iron, concrete, or the like into a box assembled using, for example, steel plates. The counterweight 5 is arranged at a rear portion of the upper swing body 2, and is used to hold the vehicle body balance in excavating work or the like.

The equipment room 6 is arranged in front of the engine room 7. The equipment room 6 houses a working oil tank, a fuel tank, and the like.

The engine room 7 is arranged behind the equipment room 6. The engine room 7 houses an engine, an exhaust gas treatment device, and the like.

The cab 8 is an operation room where the operator of the excavator 100 boards. The cab 8 is arranged in front of the engine room 7 and on the side of the working unit 1, so that the operator can see the movement of the working unit 1.

The lower traveling body 3 includes a pair of crawlers 9 each independently rotatable. The excavator 100 travels by the rotation of the crawlers 9. The lower traveling body 3 may be wheels (tires).

The excavator 100 according to the present embodiment is a so-called "rearward small-swinging type excavator (defined by Japanese Industrial Standards (JIS A 8340-4)", and satisfies the following Formulas (1) and (2).

$$(\text{rear end swinging radius} \times 2) \times 100 / (\text{full width of lower traveling body}) \leq 120 \quad (1)$$

$$(\text{front minimum swinging radius or maximum distance from center of swinging of front portion of machine body} \times 2) \times 100 / (\text{full width of lower traveling body}) \geq 120 \quad (2)$$

Therefore, in the rearward small-swinging type excavator, the protruding amount of the end portion of the counterweight 5 from the lower traveling body 3 at the time of swinging is equal to or less than a predetermined ratio of the width of the lower traveling body 3.

The "rear end swinging radius" is a swinging radius of the rear end portion of the upper swing body 2 including the working unit 1. The "front minimum swinging radius" is a minimum swinging radius at the front of the upper swing body 2. The "full width of lower traveling body" is a full width of the lower traveling body 3 in the vehicle width direction of the lower traveling body 3. The counterweight 5 is defined in a predetermined dimension related to the swinging radius of the upper swing body 2.

As illustrated in FIG. 2, there is a case where the excavator 100 scoops soil by the bucket 11 and then, swings the upper swing body 2 while putting the boom 13 into an erected posture by raising the boom 13 to an upper end position of the movable range of the boom 13. After swinging the upper swing body 2, the soil in the bucket 11 is discharged, for example, to a load-carrying platform of a dump truck. The excavator 100 can swing the upper swing body 2 within a small space by putting the boom 13 into the erected posture. Also, the distance between the operator in the cab 8 and the bucket 11 becomes small. Therefore, the operator easily confirms the state of the bucket 11.

In the following description, as illustrated in FIG. 2, a posture of the working unit 1, in which the boom 13 is moved to the upper end position of the movable range and the arm 12 is brought closer to the boom 13, is appropriately referred to as a small-swinging posture.

Figure 3:
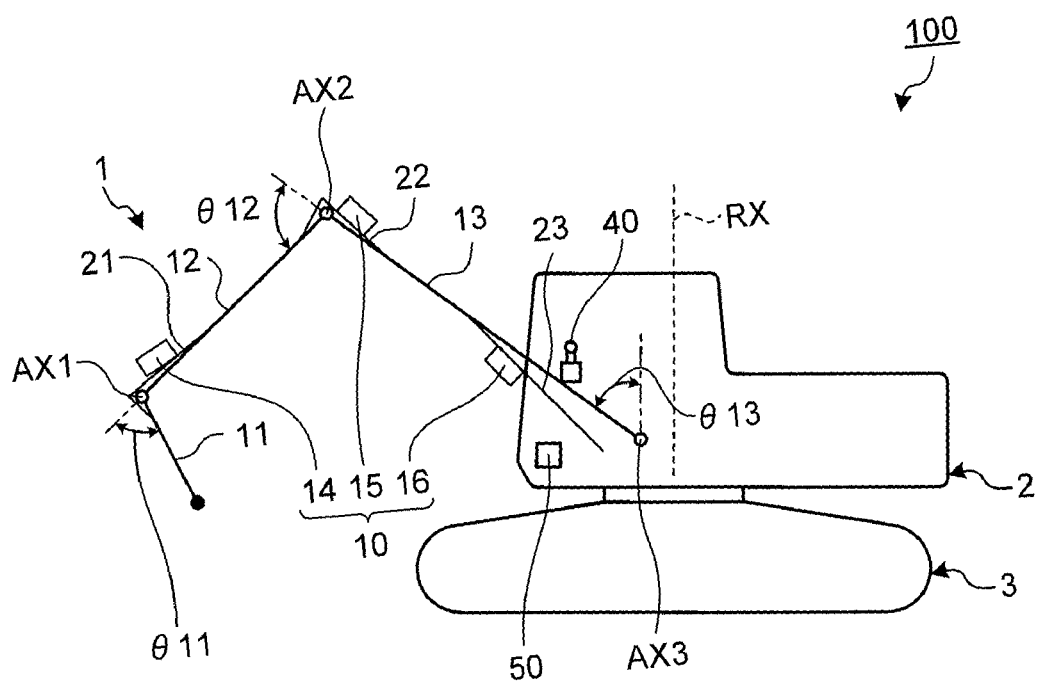
FIG. 3 is a side view schematically illustrating an example of the excavator according to the present embodiment.

FIG. 3 is a side view schematically illustrating the excavator 100 according to the present embodiment. As illustrated in FIG. 3, the excavator 100 is provided with a detection device 10, an operation device 40, and a control device 50. The detection device 10 detects a posture of the working unit 1. The operation device 40 is for operating the working unit 1. The control device 50 controls the working unit 1. In the present embodiment, the posture of the working unit 1 includes an angle of the working unit 1. The detection device 10 detects the angle of the working unit 1.

The control device 50 includes a computer system. The control device 50 includes a processor such as a central processing unit (CPU), a storage device such as a read only memory (ROM) or a random access memory (RAM), and an input/output interface device.

The detection device 10 includes a bucket posture detector 14, an arm posture detector 15, and a boom posture detector 16. The bucket posture detector 14 detects an angle θ11 of the bucket 11 around the central axis AX1. The arm posture detector 15 detects an angle θ12 of the arm 12 around the central axis AX2. The boom posture detector 16 detects an angle 913 of boom 13 around the central axis AX3.

In the present embodiment, the bucket posture detector 14 is a bucket cylinder stroke sensor arranged on the bucket cylinder 21. The bucket cylinder stroke sensor detects a bucket cylinder length which is a stroke length of the bucket cylinder 21. A detection signal from the bucket posture detector 14 is output to the control device 50. In the present embodiment, the control device 50 calculates the angle θ11 of the bucket 11 relative to the arm 12 based on the bucket cylinder length detected by the bucket posture detector 14. The angle θ11 of the bucket 11, and the bucket cylinder length of the bucket cylinder 21 are correlated. Correlation data between the angle θ11 of the bucket 11 and the bucket cylinder length is known data. The control device 50 calculates the angle θ11 of the bucket 11 based on the bucket cylinder length of the bucket cylinder 21 detected by the bucket posture detector 14, and the correlation data.

The arm posture detector 15 is an arm cylinder stroke sensor arranged on the arm cylinder 22. The angle θ12 of the arm 12 is calculated in the same calculation procedure as that of the angle θ11 of the bucket 11.

The boom posture detector 16 is a boom cylinder stroke sensor arranged on the boom cylinder 23. The angle θ13 of the boom 13 is calculated in the same calculation procedure as that of the angle θ11 of the bucket 11.

The control device 50 calculates cylinder velocity of the hydraulic cylinder 20 based on a detection signal from the detection device 10. The control device 50 carries out calculation processing based on the detection signal from the bucket posture detector 14, and calculates cylinder velocity of the bucket cylinder 21. The control device 50 carries out calculation processing based on a detection signal from the arm posture detector 15, and calculates cylinder velocity of the arm cylinder 22. The control device 50 carries out calculation processing based on a detection signal from the boom posture detector 16, and calculates cylinder velocity of the boom cylinder 23.

As described above, in the present embodiment, each of the posture detectors 14, 15, and 16 including the cylinder stroke sensors functions as an angle sensor, a stroke sensor, and a cylinder velocity sensor.

The detection device 10 may include an angle sensor such as a potentiometer. By such angle sensor, the angle θ11 of the bucket 11, the angle θ12 of the arm 12, and the angle 913 of the boom 13 may be detected, and angular velocity of the bucket 11, angular velocity of the arm 12, and angular velocity of the boom 13 may be detected.

On the excavator 100, a GPS antenna that acquires the position of the upper swing body 2 may be provided, and an IMU that detects the inclination of the upper swing body 2 may be provided. The GPS refers to a global positioning system. The IMU refers to an inertial measurement unit.

The operation device 40 is arranged in the cab 8. The operation device 40 includes left and right operation members which are operated by the operator of the excavator 100. The operation members include operation levers or joysticks. The working unit 1 is operated by operating the operation members.

The operation device 40 operates the hydraulic cylinder 20. The working unit 1 is operated by the operation of the hydraulic cylinder 20 which is performed by the operation device 40. By operating the operation device 40, a dumping operation of the bucket 11, an excavating operation of the bucket 11, a dumping operation of the arm 12, an excavating operation of the arm 12, a raising operation of the boom 13, and a lowering operation of the boom 13 are executed.

In the present embodiment, the operation device includes a right operation lever and a left operation lever arranged on the right side and the left side, respectively, of the operator seated on the driver's seat of the cab 8. When the right operation lever is operated in the front-rear direction, the boom 13 performs the lowering operation and the raising operation. When the right operation lever is operated in the left-right direction (vehicle width direction), the bucket 11 performs the excavating operation and the dumping operation. When the left operation lever is operated in the front-rear direction, the arm 12 performs the dumping operation and the excavating operation. When the left operation lever is operated in the left-right direction, the upper swing body 2 swings to the left and right, respectively. The upper swing body 2 may swing to the right and left when the left operation lever is operated in the front-rear direction. Also, the arm 12 may perform the dumping operation and the excavating operation when the left operation lever is operated in the left-right direction.

In the present embodiment, the bucket 11 and the arm 12 are driven based on the operation of the operation device 40 by the operator. The boom 13 is driven based on the operation of the operation device 40 by the operator and/or the control by the control device 50.

[Hydraulic System]

Next, an example of a hydraulic system 300 according to the present embodiment will be described. The hydraulic cylinder 20 that includes the bucket cylinder 21, the arm cylinder 22, and the boom cylinder 23 is actuated by the hydraulic system 300. The hydraulic cylinder 20 is operated by the operation device 40.

In the present embodiment, the operation device is an operation device of a pilot hydraulic pressure system. In the following description, the oil supplied to the hydraulic cylinder 20 (bucket cylinder 21, arm cylinder 22, and boom cylinder 23) for actuating the hydraulic cylinder 20 is appropriately referred to as a working oil. The amount of the working oil supplied to the hydraulic cylinder 20 is adjusted by a directional control valve 41. The directional control valve 41 is actuated depending on the oil supplied thereto. In the following description, the oil supplied to the directional control valve 41 for actuating the directional control valve 41 is appropriately referred to as a pilot oil. The pressure of the pilot oil is appropriately referred to as a pilot hydraulic pressure.

Figure 4:
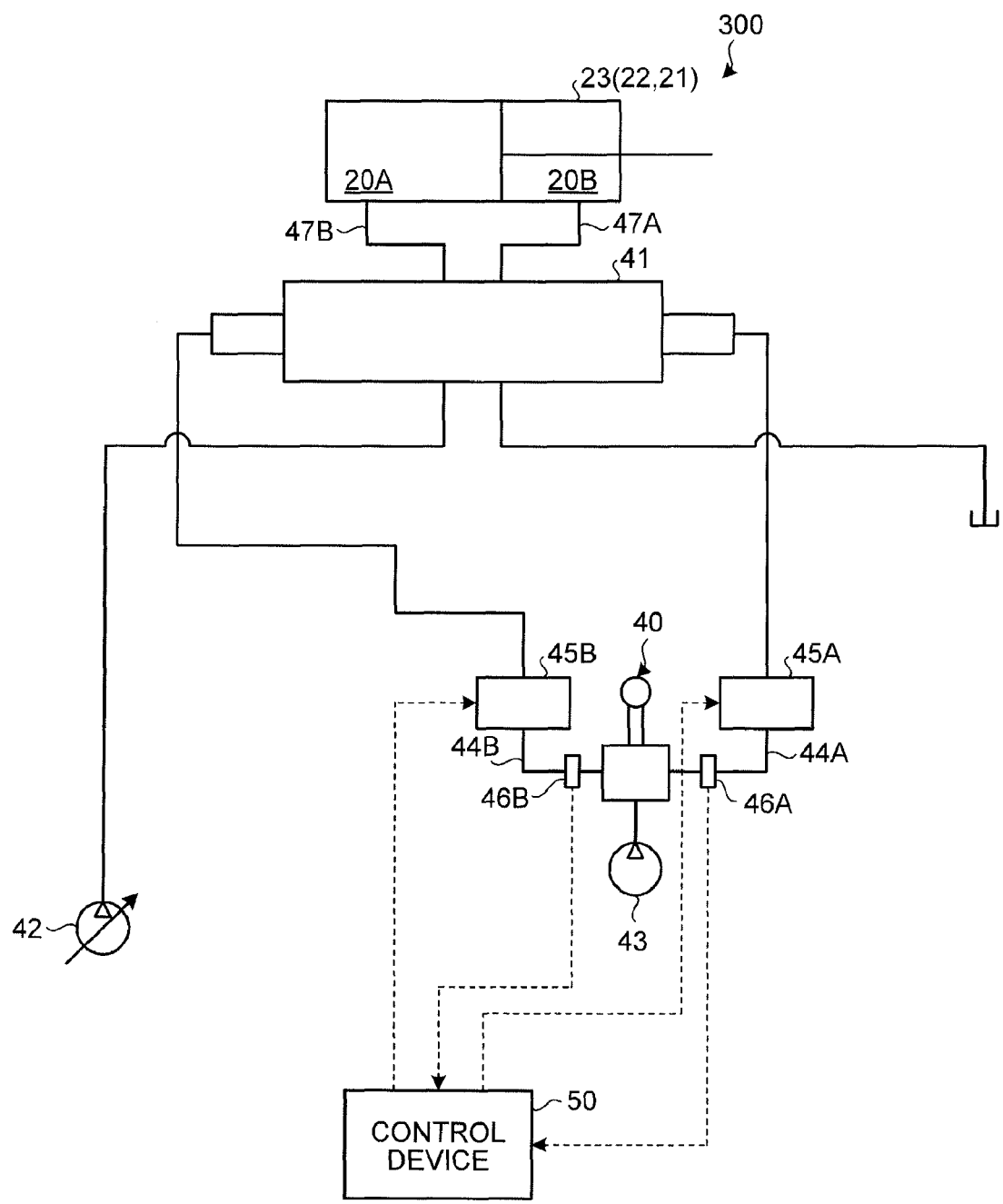
FIG. 4 is a schematic diagram illustrating an example of a hydraulic system according to the present embodiment.

FIG. 4 is a schematic diagram illustrating an example of the hydraulic system 300 that actuates the boom cylinder 23. The boom 13 executes two types of operations, i.e., the raising operation and the lowering operation, by the operation of the operation device 40. The boom 13 is raised when the boom cylinder 23 is extended, and the boom 13 is lowered when the boom cylinder 23 is contracted.

As illustrated in FIG. 4, the hydraulic system 300 that actuates the boom cylinder 23 is provided with the directional control valve 41, a main hydraulic pump 42, a pilot hydraulic pump 43, the operation device 40, oil passages 44A and 44B, control valves 45A and 45B, pressure sensors 46A and 46B, and the control device 50. The main hydraulic pump 42 is a variable-displacement pump that supplies the working oil to the boom cylinder 23 via the directional control valve 41. The pilot hydraulic pump 43 supplies the pilot oil. The operation device 40 adjusts the pilot hydraulic pressure to the directional control valve 41. The pilot oil flows through the oil passages 44A and 44B. The control valves 45A and 45B, and the pressure sensors 46A and 46B are arranged in the oil passages 44A and 44B, respectively. The control device 50 controls the control valves 45A and 45B. The main hydraulic pump 42 is driven by a prime mover such as the engine (not illustrated).

The directional control valve 41 includes a first pressure-receiving chamber and a second pressure-receiving chamber (not illustrated). A spool is driven by the pilot hydraulic pressure of the oil passage 44A, and the first pressure-receiving chamber is connected to the main hydraulic pump 42. Then, the working oil is supplied to the first pressure-receiving chamber. A spool is driven by the pilot hydraulic pressure of the oil passage 44B, and the second pressure-receiving chamber is connected to the main hydraulic pump 42. Then, the working oil is supplied to the second pressure-receiving chamber.

The directional control valve 41 controls the direction in which the working oil flows. The working oil supplied from the main hydraulic pump 42 is supplied to the boom cylinder 23 via the directional control valve 41. The directional control valve 41 is a spool valve that switches the direction in which the working oil flows by moving the rod-shaped spool. By moving the spool in the axial direction, the supply of the working oil to a cap-side oil chamber 20A (oil passage 47B) of the boom cylinder 23, and the supply of the working oil to a rod-side oil chamber 20B (oil passage 47A) of the boom cylinder 23 are switched. When the working oil is supplied to the first pressure-receiving chamber, the working oil is supplied to the rod-side oil chamber 20B via the oil passage 47A, and the boom cylinder 23 is contracted. Therefore, the boom 13 is lowered. Alternatively, when the working oil is supplied to the second pressure-receiving chamber, the working oil is supplied to the cap-side oil chamber 20A via the oil passage 47B, and the boom cylinder 23 is extended.
Therefore, the boom 13 is raised.

The cap-side oil chamber 20A is the space between a cylinder head cover and a piston. The rod-side oil chamber 20B is the space where a piston rod is arranged. By moving the spool in the axial direction, the amount of the working oil supplied to the boom cylinder 23 (amount supplied per unit time) is adjusted. The cylinder velocity is adjusted by adjusting the amount of the working oil supplied to the boom cylinder 23.

The directional control valve 41 is operated by the operation device 40. The pilot oil fed out from the pilot hydraulic pump 43 is supplied to the operation device 40. The pilot oil fed out from the main hydraulic pump 42 and decompressed by a decompression valve may be supplied to the operation device 40. The operation device 40 includes a pilot hydraulic pressure adjusting valve. The pilot hydraulic pressure is adjusted based on the operation amount of the operation device 40. By operating the operation device 40, the pilot hydraulic pressure corresponding to the operation amount of the operation device 40 acts on the directional control valve 41. The directional control valve 41 is driven by such pilot hydraulic pressure. The spool of the directional control valve 41 moves in accordance with the pilot hydraulic pressure. The amount of the working oil supplied per unit time from the main hydraulic pump 42 to the boom cylinder 23 via the directional control valve 41 is adjusted based on the moving amount of the spool. The pilot hydraulic pressure is adjusted by the operation device 40. Therefore, the moving amount and the moving velocity of the spool in the axial direction are adjusted.

When the operation lever of the operation device is operated from the neutral position to the side of the oil passage 44A, the pilot hydraulic pressure corresponding to the operation amount of such operation lever acts on the first pressure-receiving chamber of the spool of the directional control valve 41. Alternatively, when the operation lever of the operation device 40 is operated from the neutral position to the side of the oil passage 44B, the pilot hydraulic pressure corresponding to the operation amount of such operation lever acts on the second pressure-receiving chamber of the spool of the directional control valve 41.

The pressure sensor 46A detects the pilot hydraulic pressure of the oil passage 44A. The pressure sensor 46B detects the pilot hydraulic pressure of the oil passage 44B. Detection signals from the pressure sensors 46A and 46B are output to the control device 50.

The control valves 45A and 45B are electromagnetic proportional control valves. The control valves 45A and 45B adjust the pilot hydraulic pressure based on a command signal from the control device 50. The control valve 45A adjusts the pilot hydraulic pressure of the oil passage 44A. The control valve 45B adjusts the pilot hydraulic pressure of the oil passage 44B.

The control device 50 is capable of decompression adjustment of the pilot hydraulic pressure that acts on the first pressure-receiving chamber by controlling the control valve 45A. The control device 50 is capable of decompression adjustment of the pilot hydraulic pressure that acts on the second pressure-receiving chamber by controlling the control valve 45B. In the example illustrated in FIG. 4, the pilot hydraulic pressure adjusted by the operation of the operation device 40 is reduced by the control valve 45A. Therefore, the pilot oil supplied to the directional control valve 41 is restricted. The pilot hydraulic pressure that acts on the directional control valve 41 is reduced by the control valve 45A. Therefore, the lowering operation of the boom 13 is restricted. Similarly, the pilot hydraulic pressure adjusted by the operation of the operation device 40 is reduced by the control valve 45B. Therefore, the pilot oil supplied to the directional control valve 41 is restricted. The pilot hydraulic pressure that acts on the directional control valve 41 is reduced by the control valve 45B. Therefore, the raising operation of the boom 13 is restricted. The control device 50 controls the control valve 45A based on the detection signal from the pressure sensor 46A. The control device 50 controls the control valve 45B based on the detection signal from the pressure sensor 46B.

The hydraulic system 300 that actuates the arm cylinder 22 and the bucket cylinder 21 has the same configuration as the hydraulic system 300 that actuates the boom cylinder 23. The arm 12 executes two types of operations, i.e., the excavating operation and the dumping operation, by the operation of the operation device 40. The arm 12 performs excavation when the arm cylinder 22 is extended, and the arm 12 performs dumping when the arm cylinder 22 is contracted. The bucket 11 executes two types of operations, i.e., the excavating operation and the dumping operation, by the operation of the operation device 40. The bucket 11 performs excavation when the bucket cylinder 21 is extended, and the bucket 11 performs dumping when the bucket cylinder 21 is contracted. Detailed description of the hydraulic system 300 that actuates the arm cylinder 22 and the bucket cylinder 21 is omitted.

[Control System]

Figure 5:
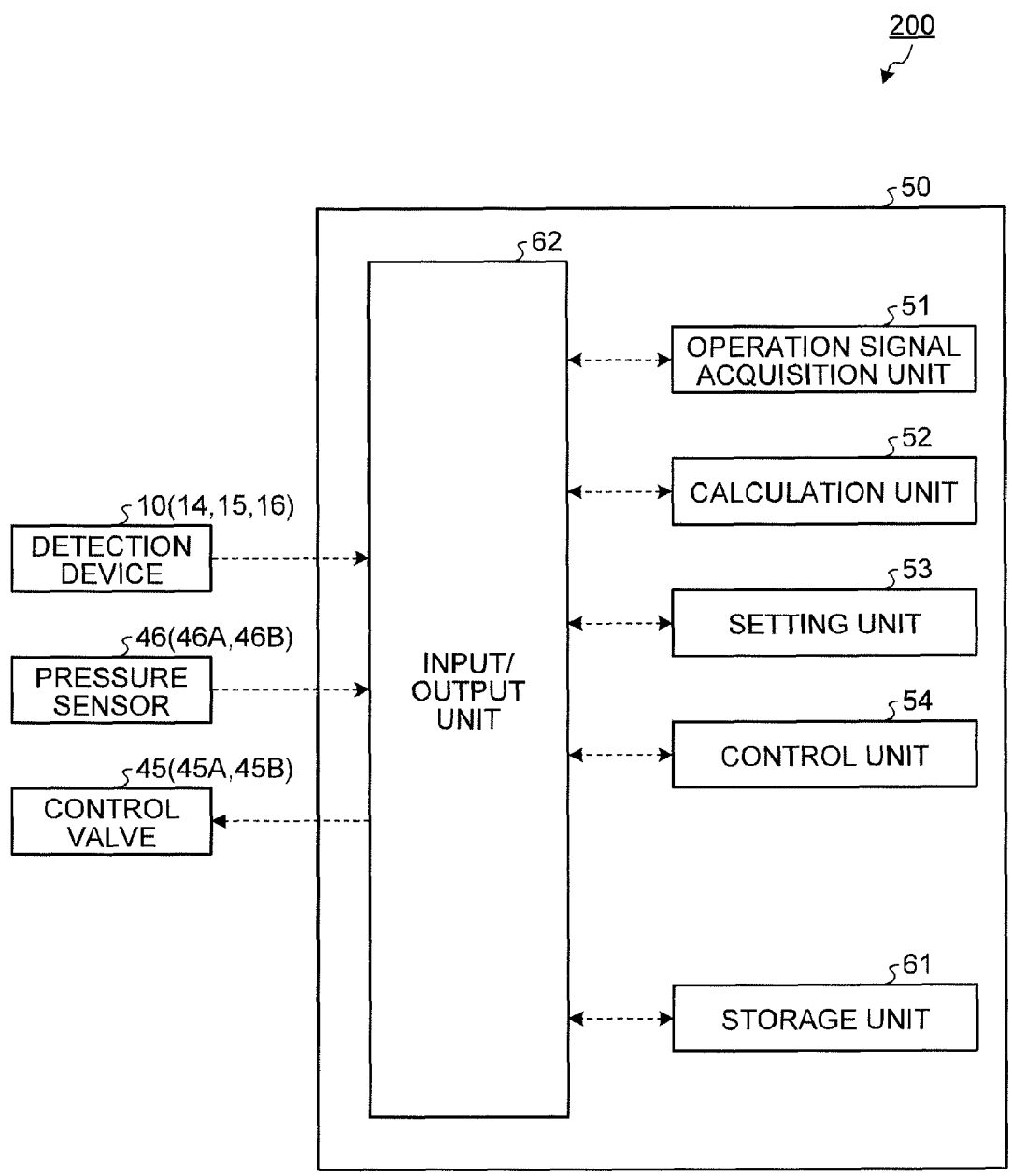
FIG. 5 is a functional block diagram illustrating an example of a control system according to the present embodiment.

Next, a control system 200 of the excavator 100 according to the present embodiment will be described. FIG. 5 is a functional block diagram illustrating an example of the control system 200 according to the present embodiment.

As illustrated in FIG. 5, the control system 200 is provided with the control device 50, the detection device 10, a pressure sensor 46 (46A and 46B), and a control valve 45 (45A and 45B). The control device 50 controls the working unit 1. The detection device 10 detects the angle of the working unit 1 and a cylinder stroke of the hydraulic cylinder 20 by detecting a stroke length of the hydraulic cylinder 20. The pressure sensor 46 (46A and 46B) detects the pilot hydraulic pressure of an oil passage 44 (44A and 44B). The control valve 45 (45A and 45B) is capable of adjusting the amount of the working oil supplied to the hydraulic cylinder 20.

The control device 50 includes an operation signal acquisition unit 51, a calculation unit 52, a setting unit 53, a control unit 54, a storage unit 61, and an input/output unit 62. The operation signal acquisition unit 51 acquires an operation signal output from the pressure sensor 46 when the operation device 40 is operated. The calculation unit 52 determines whether the working unit 1 is in a stopped state at the stop position in the movable range of the working unit 1 based on the detection signal of the detection device 10. The setting unit 53 sets a deceleration section including an end position of the movable range and a deceleration ratio of the working unit 1 in the deceleration section based on the angle of the working unit 1 in the stopped state at the stop position in the movable range of the working unit 1, and on a threshold determined in advance. The control unit 54 outputs a command signal to the control valve 45 so that the working unit 1 moves from the stop position to the end position based on the deceleration section and the deceleration ratio. The storage unit 61 stores various kinds of data.

The operation signal acquisition unit 51 acquires the operation signal output from the pressure sensor 46 when the operation device 40 is operated. The operation signal acquisition unit 51 can recognize, by acquiring the operation signal, the timing when the operation lever of the operation device 40 is operated from the neutral position so that the boom 13 is raised. A case where the operation lever of the operation device 40, in which the detection of the pressure sensor 46 is less than a predetermined value that is almost zero, is set in the neutral position indicates that the boom 13 (boom cylinder 23) is in the stopped state. Therefore, the operation signal acquisition unit 51 can recognize, by acquiring the operation signal, the timing when the boom 13 in the stopped state starts the raising operation. An angle detection sensor such as a potentiometer is provided on the operation lever which is in the electric lever of the operation device 40 that outputs an electric signal. The operation signal acquisition unit 51 acquires a detected value as the operation signal.

The calculation unit 52 carries out calculation processing based on the detection signal from the detection device 10. The calculation unit 52 calculates the angles θ11, θ12, and θ13, and the cylinder velocities of the bucket cylinder 21, the arm cylinder 22, and the boom cylinder 23 based on the detection signals of the posture detectors 14, 15, and 16 of the detection device 10, respectively. The calculation unit 52 can determine whether the working unit 1 is in a stopped state in the movable range of the working unit 1 by the calculation of the cylinder velocity of the hydraulic cylinder 20.

The setting unit 53 sets the deceleration ratio of the working unit 1. In the present embodiment, the setting unit 53 sets a deceleration ratio of the boom 13. The deceleration ratio is a ratio of decelerated velocity of the boom 13 when the maximum velocity at which the boom 13 can move is set to 100 [%]. In other words, the deceleration ratio of the boom 13 is the decelerated velocity of the boom 13 that takes the possible maximum velocity for the boom 13 as a reference. The moving velocity of the boom 13 is proportional to the cylinder velocity of the boom cylinder 23. The deceleration ratio of the boom 13 is set by setting a deceleration ratio of the boom cylinder 23. The deceleration ratio of the boom cylinder 23 is a ratio of the cylinder velocity of the boom cylinder 23 when the maximum value of the cylinder velocity of the boom cylinder 23 (hereinafter referred to as maximum cylinder velocity) is set to 100 [%]. In other words, the deceleration ratio of the boom cylinder 23 is the cylinder velocity of the boom cylinder 23 that takes the maximum cylinder velocity of the boom cylinder 23 as a reference.

The setting unit 53 sets a deceleration section of the boom 13 within the movable range of the boom 13, and the deceleration ratio of the boom 13 in such deceleration section. The deceleration section of the boom 13 is a section including an upper end position of the movable range of the boom 13. As described with reference to FIG. 2, there is a case where the boom 13 is raised to the upper end position of the movable range of the boom 13 to put the boom 13 into the small-swinging posture. The setting unit 53 sets the deceleration section where the boom 13 decelerates just before the upper end position when the boom 13 is raised and moves to the upper end position of the movable range. Additionally, the setting unit 53 sets the deceleration ratio of the boom 13 in the deceleration section. The deceleration ratio of the boom 13 in the deceleration section includes moving velocity conditions (moving velocity distribution and moving velocity profile) of the boom 13 at the deceleration section.

The movable range of the boom 13 is equivalent to a movable range of the boom cylinder 23, and corresponds thereto one-to-one. In the present embodiment, when the boom cylinder 23 extends maximally, the boom 13 is arranged at the upper end position of the movable range. In the following description, an end position of the boom cylinder 23, when the boom cylinder 23 extends maximally and the boom 13 is arranged at the upper end position of the movable range, is appropriately referred to as a cylinder stroke end. Also, the position of the boom cylinder 23 from the cylinder stroke end (stroke length) is appropriately referred to as a cylinder stroke. The cylinder stroke refers to the boom cylinder length described above, and is detected by the boom posture detector 16 of the detection device 10.

In the present embodiment, the setting unit 53 sets the deceleration section of the boom cylinder 23 within the movable range of the boom cylinder 23, and the deceleration ratio of the boom cylinder 23 in such deceleration section. The deceleration section of the boom cylinder 23 is a section including the cylinder stroke end of the movable range of the boom cylinder 23. The setting unit 53 sets the deceleration section for the boom cylinder 23 to decelerate just before the cylinder stroke end when the boom cylinder 23 moves to the cylinder stroke end. Also, the setting unit 53 sets the deceleration ratio of the boom cylinder 23 in the deceleration section. The deceleration ratio of the boom cylinder 23 in the deceleration section includes cylinder velocity conditions (cylinder velocity distribution and cylinder velocity profile) of the boom cylinder 23 at the deceleration section.

In the following description, the angle θ13 of the boom 13 is to be detected by the detection of the cylinder stroke (stroke length) of the boom cylinder 23 by the boom posture detector 10. Additionally, the moving velocity including the deceleration ratio of the boom 13 and the movable range including the deceleration section of the boom 13 are to be set by setting the cylinder velocity including the deceleration ratio of the boom cylinder 23 and the movable range including the deceleration section of the boom cylinder 23, respectively. In other words, for example, the cylinder stroke, the deceleration ratio, the cylinder velocity, the deceleration section, and the movable range of the boom cylinder 23 may be replaced with the angle θ13, the deceleration ratio, the angular velocity, the deceleration section, and the movable range of the boom 13, respectively.

Figure 6:
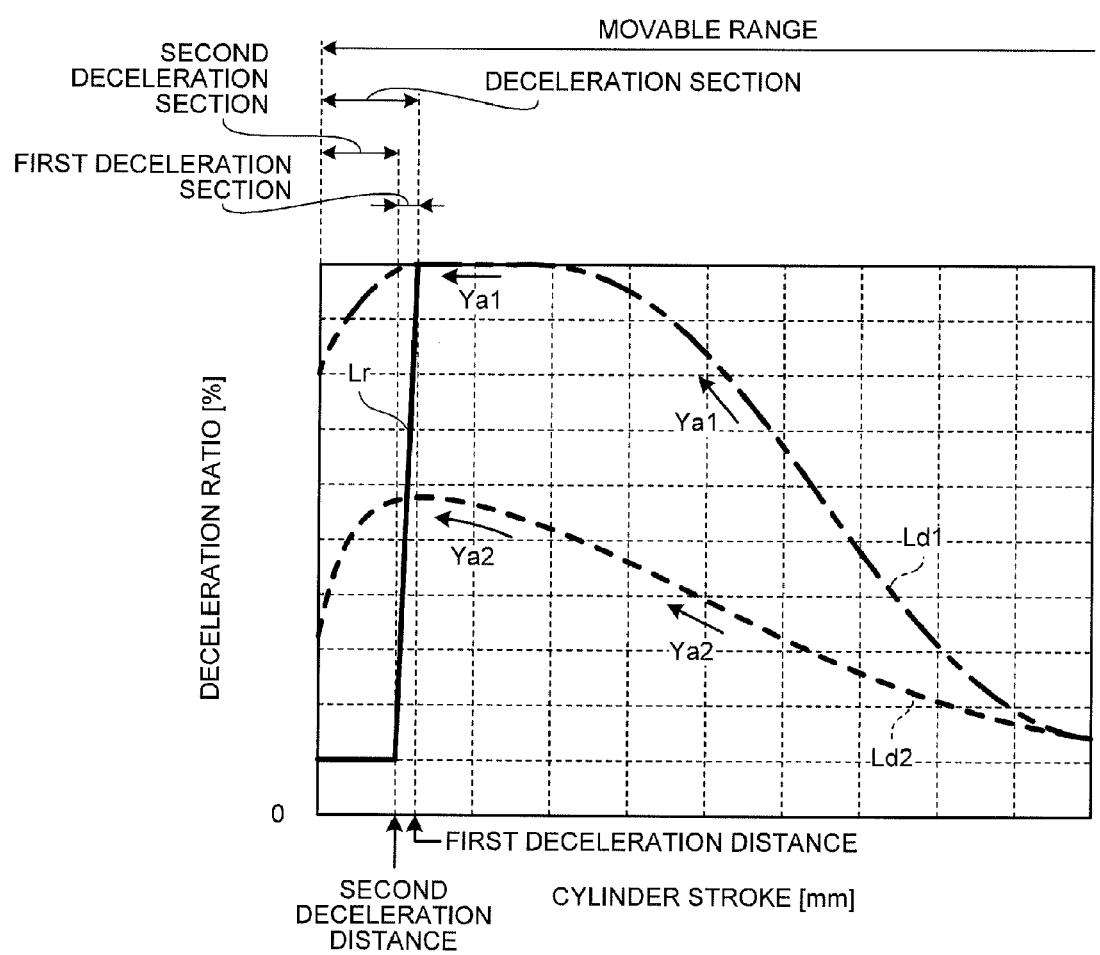
FIG. 6 is a diagram for explaining an example of an operation of a work machine according to the present embodiment.

FIG. 6 is a diagram illustrating an example of the deceleration section and the deceleration ratio set by the setting unit 53. As illustrated in FIG. 6, the setting unit 53 sets the table data that indicates the relationship between the cylinder stroke from the cylinder stroke end and the deceleration ratio of the boom cylinder 23. In FIG. 6, the horizontal axis represents the cylinder stroke from the cylinder stroke end, and the vertical axis represents the deceleration ratio of the boom cylinder 23.

A case where the cylinder stroke is 0 [mm] indicates that the boom cylinder 23 is extended maximally and is positioned at the cylinder stroke end (boom 13 is positioned at the upper end position). As the value of the cylinder stroke gets larger, the boom cylinder 23 contracts more and is positioned at a position more apart from the cylinder stroke end (boom 13 is positioned at a position in the lowering direction).

A case where the deceleration ratio is 100 [%] indicates that the boom cylinder 23 moves at the maximum cylinder velocity. On the other hand, a case where the deceleration ratio is 0 [%] indicates that the boom cylinder 23 stops.

In the example illustrated in FIG. 6, the deceleration section includes the cylinder stroke end, and the cylinder stroke is set in a section from 0 [mm] to a first deceleration distance. Also, the deceleration section includes a first deceleration section and a second deceleration section. The first deceleration section is a section where the cylinder velocity of the boom cylinder 23 is decelerated at a preset deceleration (negative acceleration). The second deceleration section is a section where the boom cylinder 23 is moved to the cylinder stroke end at a constant minimum deceleration ratio (minimum cylinder velocity). The first deceleration section is set to a section where the cylinder stroke is from a second deceleration distance to the first deceleration distance. In the first deceleration section, a plurality of deceleration ratios may be set. The second deceleration section is set to a section where the cylinder stroke is from 0 [mm] to the second deceleration distance. The value of the cylinder stroke of the first deceleration distance is larger than that of the second deceleration distance.

The data that indicates the relationship between the cylinder stroke from the cylinder stroke end and the deceleration ratio set by the setting unit 53, described with reference to FIG. 6, is stored in the storage unit 61. In the following description, the data that indicates deceleration conditions of the cylinder velocity described with reference to FIG. 6 is appropriately referred to as restricted velocity data. In FIG. 6, a line Lr indicates the restricted velocity data. The restricted velocity data Lr illustrated in FIG. 6 is merely an example.

The control unit 54 outputs the command signal to the control valve 45B so that the boom cylinder 23 moves toward the cylinder stroke end based on the deceleration section and the deceleration ratio set by the setting unit 53. The control unit 54 outputs the command signal to the control valve 45B based on the cylinder velocity of the boom cylinder 23. The cylinder velocity of the boom cylinder 23 is based on the operation of the operation device 40 but, in the deceleration section, it is based on the deceleration ratio of the restricted velocity data (restricted velocity).

As illustrated in FIG. 6, the restricted velocity data Lr is generated to restrict the cylinder velocity of the boom cylinder 23 within the first deceleration distance. In FIG. 6, lines Ld1 and Ld2 indicate the cylinder velocities of the boom cylinder 23, which are based on the operation of the operation device 40. The line Ld1 indicates the cylinder velocity of when the operation signal output from the pressure sensor 46 indicates the maximum value when the operation device 40 is operated. The line Ld2 indicates the cylinder velocity of when the operation signal output from the pressure sensor 46 indicates the intermediate value, which is between the maximum value and the minimum value thereof, when the operation device 40 is operated. That is, the line Ld1 indicates the cylinder velocity of when the operation device 40 is in a so-called full-lever operation. The line Ld2 indicates the cylinder velocity of when the operation device 40 is in a half-lever operation.

When the operation device 40 is in the full-lever operation, the control unit 54 outputs a command signal Ya1 to the control valve 45B. The command signal Ya1 is output based on the operation of the operation device 40 until the cylinder stroke reaches the first deceleration distance. The command signal Ya1 is output based on the restricted velocity data Lr when the cylinder stroke is closer to the stroke end rather than the first deceleration distance. As described above, when the command signal Ya1 is output from the control unit 54 to the control valve 45B in a state where the cylinder stroke is closer to the stroke end rather than the first deceleration distance, the control valve 45B reduces the pilot hydraulic pressure adjusted by the operation of the operation device 40 based on the command signal Ya1 from the control unit 54. Therefore, the pilot oil supplied to the directional control valve 41 of the boom cylinder 23 is restricted. The pilot hydraulic pressure that acts on the directional control valve 41 is reduced by the control valve 45B. Therefore, the cylinder velocity of the boom cylinder 23 in the raising operation of the boom 13 is restricted. The control unit 52 outputs the command signal to the control valve 45B so that the boom cylinder 23 moves in accordance with the deceleration ratio (restricted velocity) of the restricted velocity data. Therefore, the boom cylinder 23 moves along the cylinder velocity profile indicated by the line Ld1, and the shock caused when reaching the cylinder stroke end is reduced.

When the operation device 40 is in the half-lever operation, the control unit 54 outputs a command signal Ya2 to the control valve 45B. The command signal Ya2 is output based on the operation of the operation device 40 until the cylinder stroke reaches the first deceleration distance. The command signal Ya2 is output based on the restricted velocity data Lr when the cylinder stroke is closer to the stroke end rather than the first deceleration distance. As described above, when the command signal Ya2 is output from the control unit 54 to the control valve 45B in a state where the cylinder stroke is closer to the stroke end rather than the first deceleration distance, the control valve 45B reduces the pilot hydraulic pressure adjusted by the operation of the operation device 40 based on the command signal Ya2 from the control unit 54. Therefore, the pilot oil supplied to the directional control valve 41 of the boom cylinder 23 is restricted. The pilot hydraulic pressure that acts on the directional control valve 41 is reduced by the control valve 45B. Therefore, the cylinder velocity of the boom cylinder 23 in the raising operation of the boom 13 is restricted. The control unit 52 outputs the command signal to the control valve 45B so that the boom cylinder 23 moves in accordance with the deceleration ratio (restricted velocity) of the restricted velocity data. Therefore, the boom cylinder 23 moves along the cylinder velocity profile indicated by the line Ld1, and the shock caused when reaching the cylinder stroke end is reduced.

Meanwhile, there is a case where the operation device 40 is operated so that the boom 13 is raised, the boom cylinder 23 (boom 13) is stopped because the operation lever of the operation device 40 has been restored to the neutral position when the boom cylinder 23 has moved close to the cylinder stroke end, and then, the operation of the operation device 40 is resumed so that the boom 13 is raised.

For example, when the working unit 1 is put into the small-swing posture as illustrated in FIG. 2, the operator operates the operation device 40 so that the boom cylinder 23 moves from the cylinder stroke end to a position close to and just before the first deceleration distance. Then, the operator restores the operation lever of the operation device 40 to the neutral position to temporarily stop the movement of the boom cylinder 23. Thereafter, the operator resumes the operation of the operation device 40 so that the boom cylinder 23 moves close to the cylinder stroke end. In a case where the boom cylinder 23, in a stopped state at a position from the cylinder stroke end to the first deceleration distance, starts moving by the operation of the operation device 40, the boom cylinder 23 accelerates toward the cylinder stroke end based on the operation of the operation device 40. Then, the command signal is output to the control valve 45 based on the set deceleration ratio at the position close to the cylinder stroke end (for example, the vicinity of the first deceleration distance). However, the distance from the cylinder stroke end to the boom cylinder 23, when the command signal is output, is short, and the boom cylinder 23 is during acceleration; therefore, the possibility of insufficient deceleration in the cylinder velocity of the boom cylinder 23 becomes high since the reduction, by the control valve 45B, of the pilot hydraulic pressure, which is based on the operation of the operation device 40, is not in time. As a result, the boom cylinder 23 reaches the cylinder stroke end at a high cylinder velocity. Therefore, the shock caused when reaching the cylinder stroke end becomes large.

There might be a case where the boom cylinder 23 is temporarily stopped at a position where the distance from the cylinder stroke end is short (for example, a position between the cylinder stroke end and close to the second deceleration distance) when the operator temporarily stops the movement of the boom 13 in raising operation. That is, the operator operates the operation device 40 so that the boom cylinder 23 moves from the cylinder stroke end to a position close to the second deceleration distance. Then, the operator restores the operation lever of the operation device 40 to the neutral position to stop the movement of the boom cylinder 23. Thereafter, the operator resumes the operation of the operation device 40 so that the boom cylinder 23 moves toward the cylinder stroke end. In a case where the boom cylinder 23, in a stopped state at a position between the cylinder stroke end and close to the second deceleration distance, starts moving by the operation of the operation device 40, the boom cylinder 23 that is in a stopped state at a stop position between the cylinder stroke end and the second deceleration distance tries to accelerate toward the cylinder stroke end based on the operation of the operation device 40. However, in the second deceleration section, the control unit 50 outputs the command signal to the control valve 45B based on the command of the minimum deceleration ratio. Therefore, the cylinder velocity is sufficiently low regardless of the acceleration of the boom cylinder 23 from the stop position. Even if the pilot hydraulic pressure is not reduced by the control valve 45B, the cylinder velocity of the boom cylinder 23, when reaching the cylinder stroke end, is low. That is, the boom cylinder 23 unnecessarily moves slowly when the pilot hydraulic pressure adjusted by the operation of the operation device 40 is reduced by the control valve 45B regardless of the shock, which is caused when reaching the cylinder stroke end, being reduced even without the reduction of the pilot hydraulic pressure by the control valve 45B.

In the present embodiment, the setting unit 53 sets the deceleration section and the deceleration ratio of the boom 13 in the deceleration section based on the angle $\theta 13$ of the boom 13 in the stopped state at the stop position in the movable range of the boom 13, and a threshold determined in advance. In the present embodiment, the setting unit 53 changes at least part of the restricted velocity data Lr described with reference to FIG. 6, based on the cylinder stroke from the cylinder stroke end of the boom cylinder 23 that has stopped, and a threshold determined in advance.

In the present embodiment, the change in the restricted velocity data includes the enlargement of the deceleration section and/or the increase of the minimum deceleration ratio.

[Control Method for Excavator]

Figure 7:
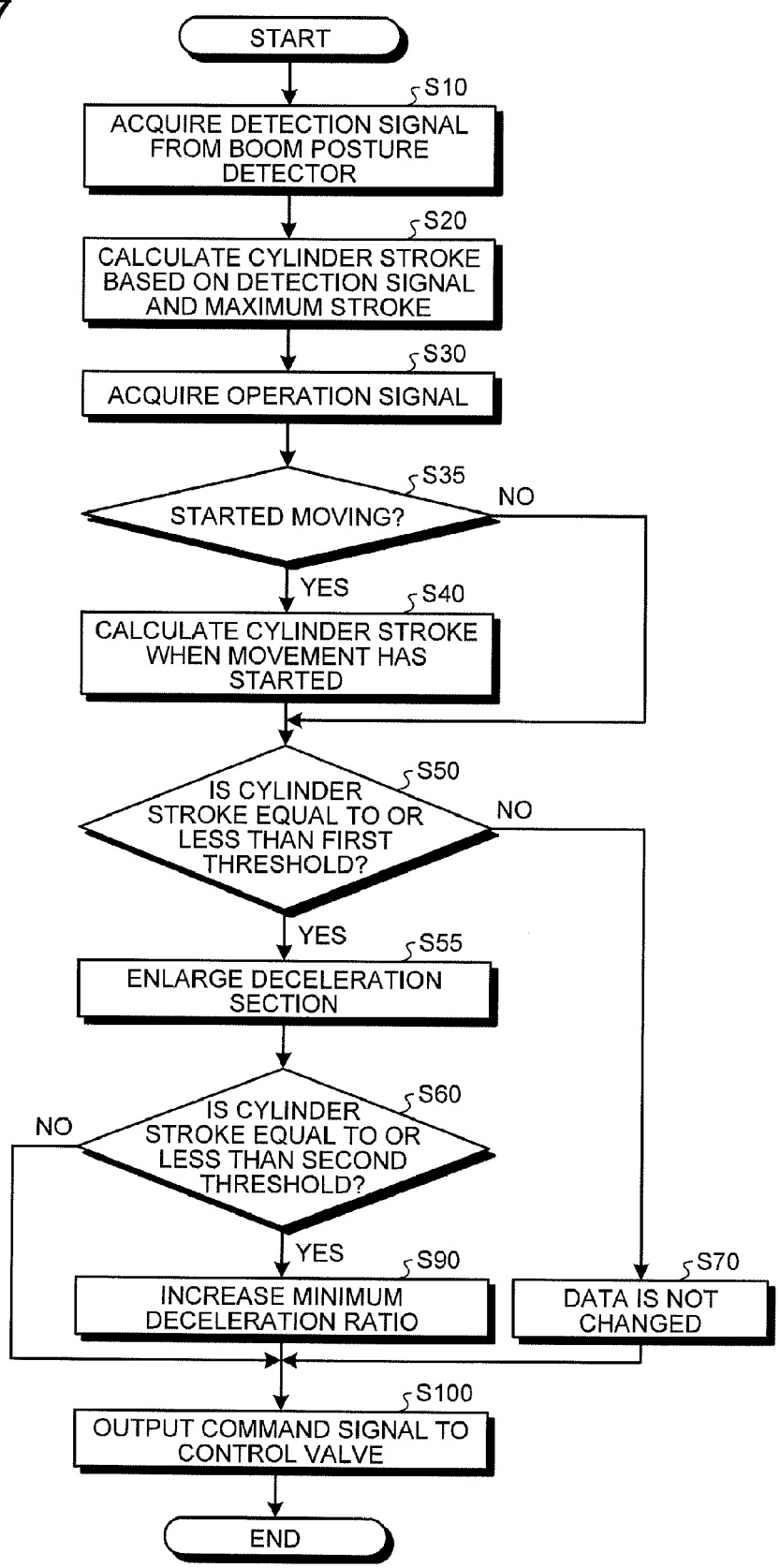
FIG. 7 is a flowchart illustrating an example of a control method for the work machine according to the present embodiment.
Figure 8:
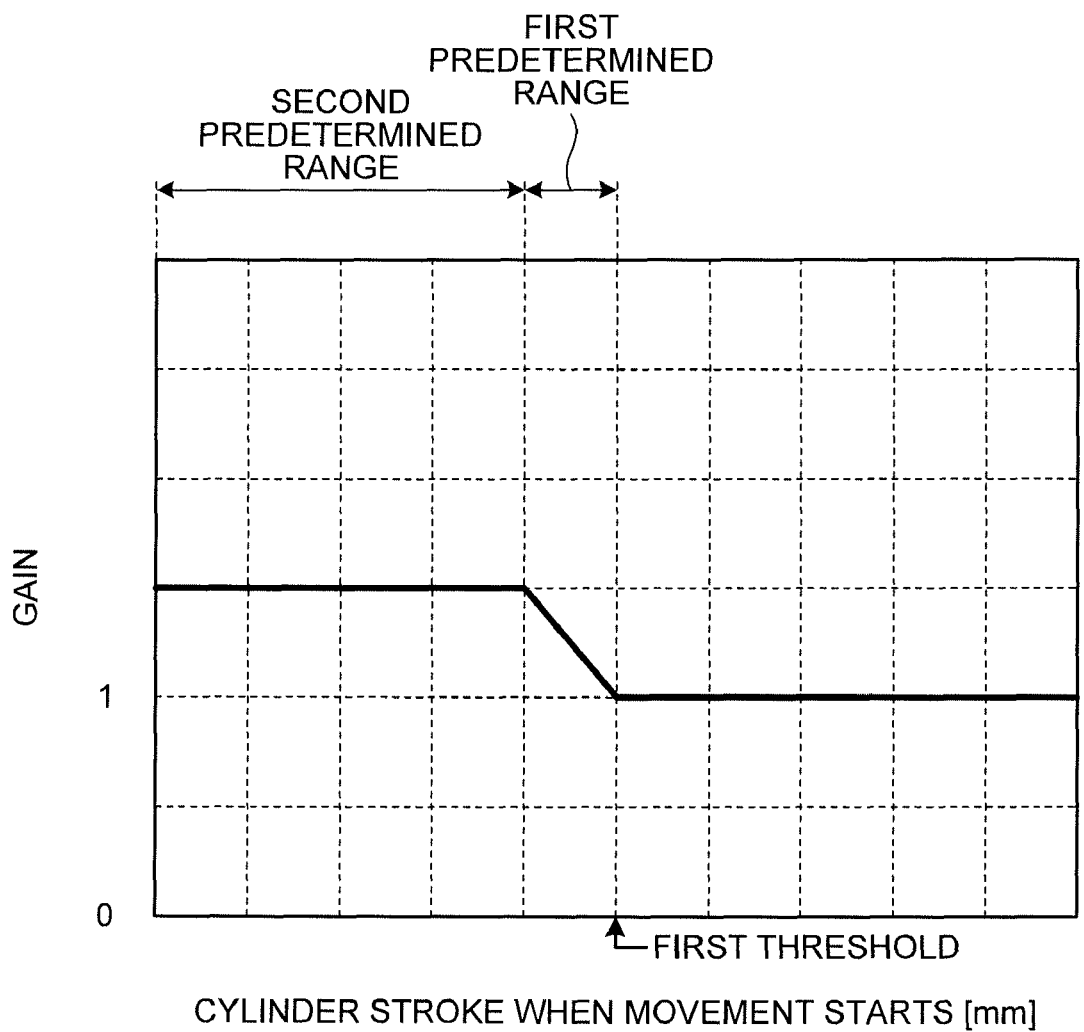
FIG. 8 is a diagram illustrating a relationship between a cylinder stroke and a gain according to the present embodiment.
Figure 9:
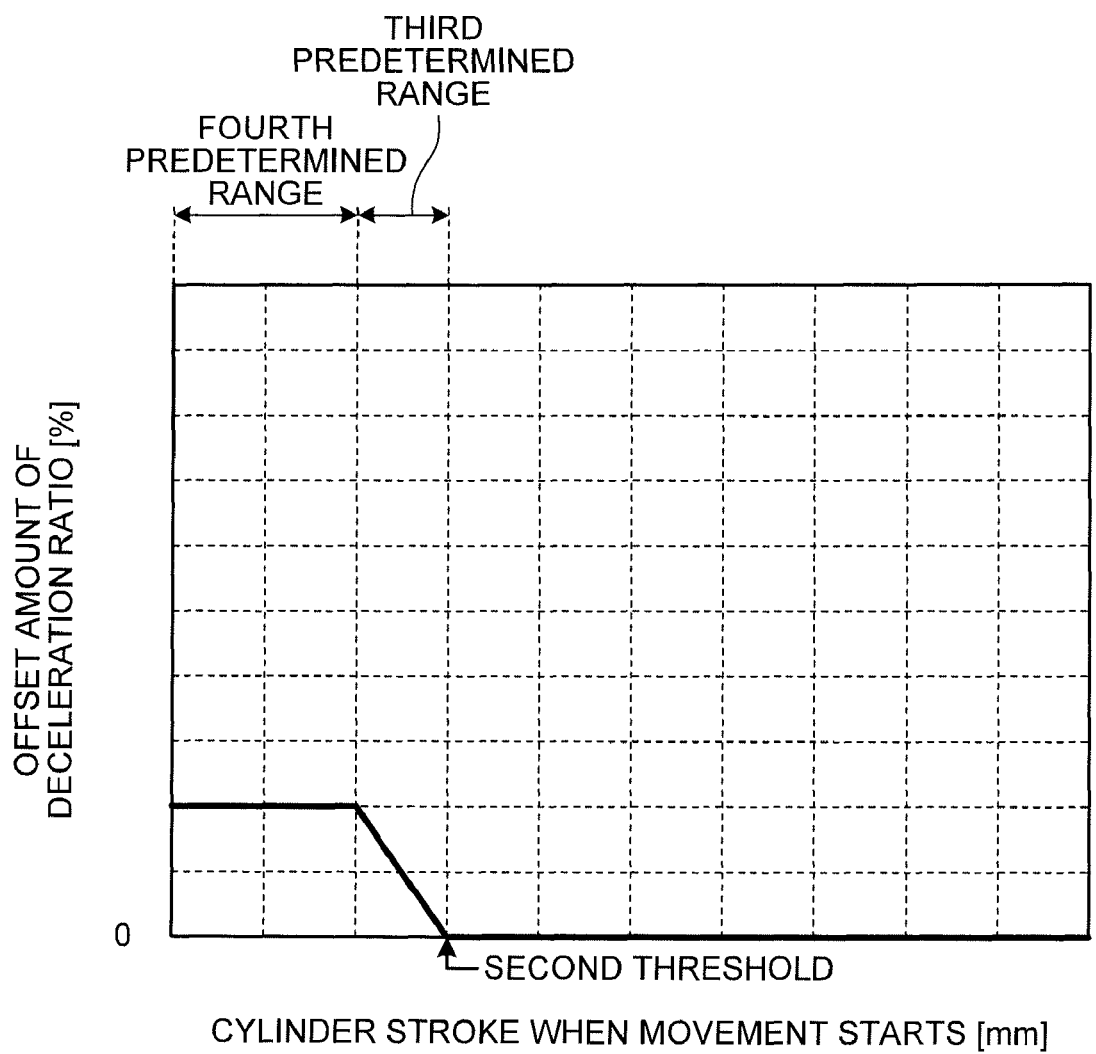
FIG. 9 is a diagram illustrating a relationship between the cylinder stroke and an offset amount according to the present embodiment.
Figure 10:
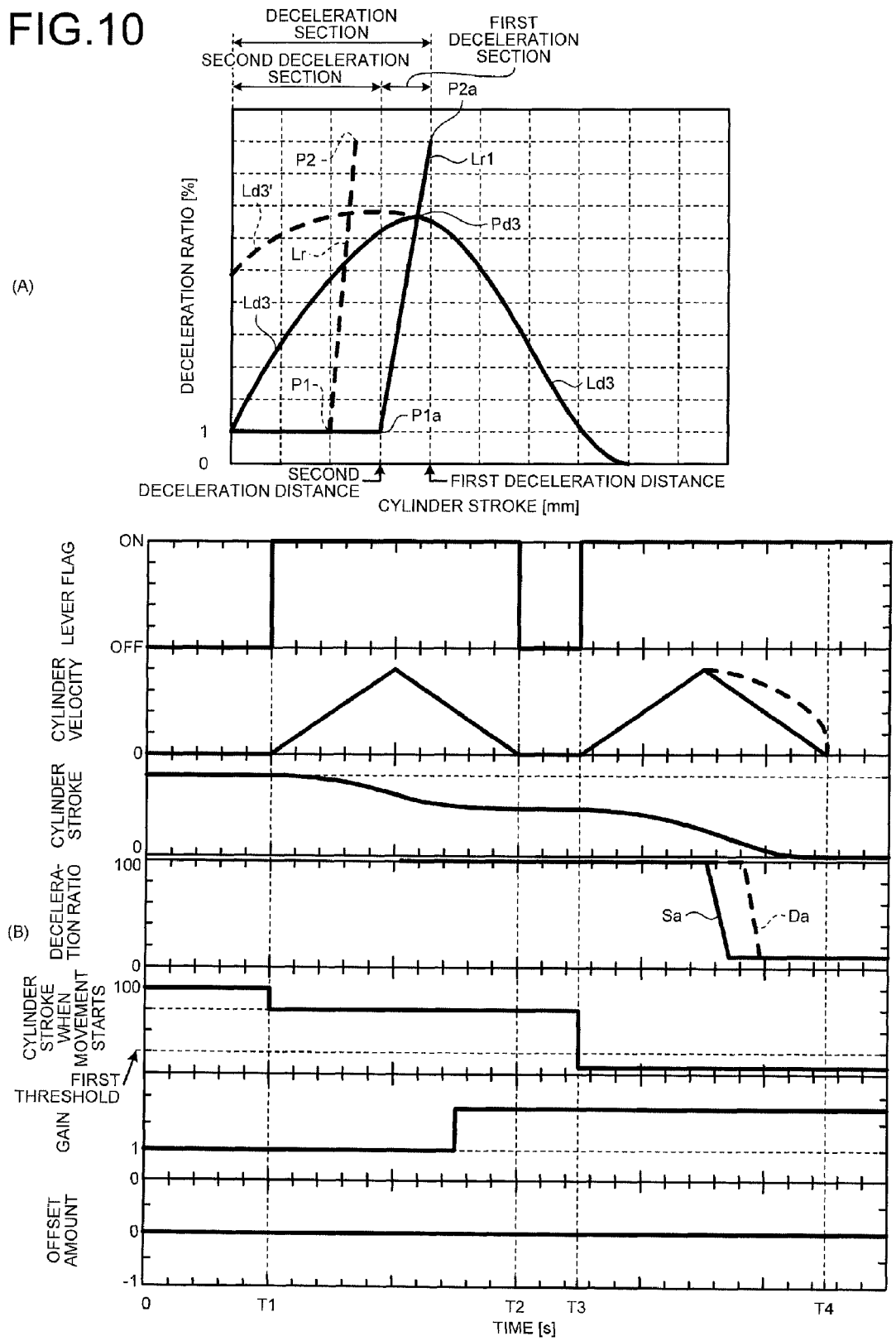
FIG. 10 is a diagram for explaining an example of an operation of the work machine according to the present embodiment.
Figure 11:
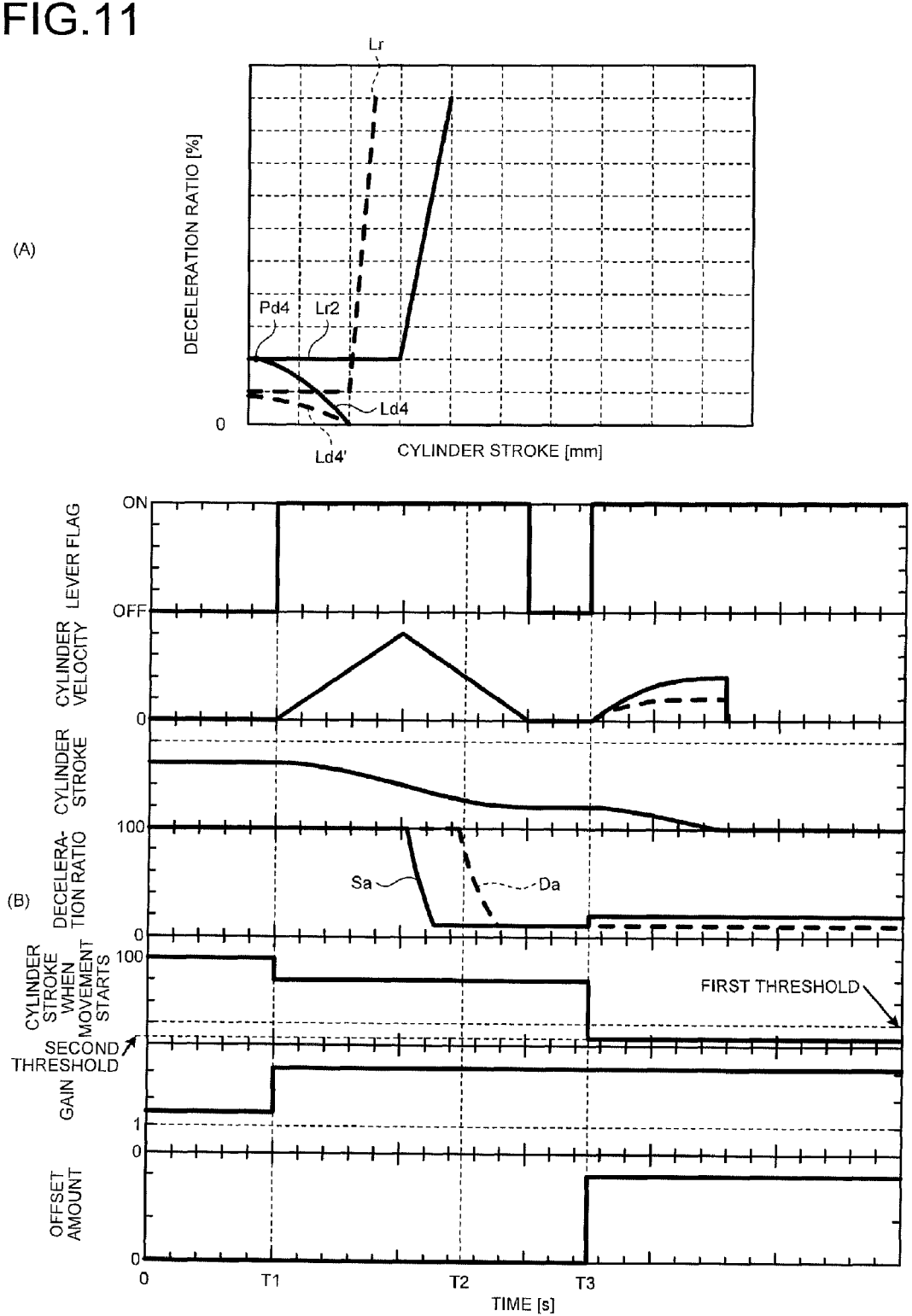
FIG. 11 is a diagram for explaining an example of an operation of the work machine according to the present embodiment.

Next, a control method for the excavator 100 according to the present embodiment will be described with reference to FIGS. 7 to 11. FIG. 7 is a flowchart illustrating the control method for the excavator 100 according to the present embodiment. FIGS. 8 and 9 are diagrams illustrating the thresholds according to the cylinder stroke of the present embodiment. FIGS. 10 and 11 are diagrams illustrating examples of the changed restricted velocity data.

In the following description, the operation by the operator to tilt the operation lever of the operation device 40 so that the boom 13 is raised is referred to as, "the operation device 40 is operated", and the operation by the operator to restore the operation lever of the operation device 40 to the neutral position is referred to as, "the operation of the operation device 40 is stopped". When the operation device 40 is operated, the boom cylinder 23 is driven, and the boom 13 is raised. When the operation of the operation device 40 is stopped, driving of the boom cylinder 23 stops, and the raising operation of the boom 13 stops. Additionally, the starting of driving the boom cylinder 23 that has been in a stopped state is referred to as, "the boom cylinder 23 has started moving".

The boom posture detector 16 detects the cylinder stroke of the boom cylinder 23. The calculation unit 52 acquires the detection signal from the boom posture detector 16 (step S10).

The calculation unit 52 calculates the cylinder stroke of the boom cylinder 23 from the cylinder stroke end based on the detection signal from the boom posture detector 16. A maximum stroke of the boom cylinder 23 is known; therefore, the calculation unit 52 calculates the cylinder stroke from the cylinder stroke end based on the cylinder stroke and the maximum stroke derived by the detection signal from the boom posture detector 16 (step S20).

The calculation unit 52 calculates the angle of the boom 13 and the cylinder velocity of the boom cylinder 23 based on the detection signal from the boom posture detector 16. The calculation unit 52 is capable of determining whether the boom 13 and the boom cylinder 23 are in stopped state based on the detection signal from the boom posture detector 16.

When the operator stops the operation of the operation device 40, the boom 13 and the boom cylinder 23 stop at the stop position in the movable range. The pressure sensor 46 detects the operation signal when the operator operates the operation device 40 in a state where the boom cylinder 23 is stopped. The operation signal detected by the pressure sensor 46 is acquired by the operation signal acquisition unit 51 (step S30).

The calculation unit 52 determines whether the boom cylinder 23 has started moving based on the operation signal detected by the pressure sensor 46 (step S35). In step S35, when it is determined that the boom cylinder 23 has started moving (step S35: Yes), the calculation unit 52 determines a time point at which the operation signal has been detected by the pressure sensor 46 and then, acquired by the operation signal acquisition unit 51, as a time point at which the boom cylinder 23 in the stopped state has started moving. Furthermore, the calculation unit 52 determines a position of the boom cylinder 23 where the operation signal has been output by the pressure sensor 46 and then, acquired by the operation signal acquisition unit 51, as a position where the driving of the boom cylinder 23 has been started, that is, a position where the movement has started. In other words, the calculation unit 52 determines the cylinder stroke from the cylinder stroke end when the driving of the boom cylinder 23 has been started, that is, when the boom cylinder 23 has started moving. The cylinder stroke, at the time point when the boom cylinder 23 has started moving, is calculated by the calculation unit 52, as the cylinder stroke from the cylinder stroke end when the movement has started, and is stored in the storage unit 61 (step S40). In step S35, when it is determined that the boom cylinder 23 has not started moving (step S35: No), the processing proceeds to step S50.

The position where the movement starts, indicated by the cylinder stroke from the cylinder stroke end when the movement starts, is the same as the stop position of the boom cylinder 23 that has been in the stopped state in the movable range. The cylinder stroke from the cylinder stroke end when the movement starts corresponds in a one-to-one relationship to the angle θ13 of the boom 13 in the stopped state at the stop position of the movable range.

The setting unit 53 compares the cylinder stroke from the cylinder stroke end when the movement has started to the threshold determined in advance. The threshold indicates a threshold of the cylinder stroke from the cylinder stroke end when the movement starts. Threshold data that indicates the threshold is stored in the storage unit 61. In the present embodiment, the threshold includes a first threshold, and a second threshold smaller than the first threshold. The first threshold is a threshold for enlarging the deceleration section. When the cylinder stroke is equal to or less than the first threshold, the deceleration section is enlarged. The second threshold is a threshold for increasing the minimum deceleration ratio. When the cylinder stroke is equal to or less than the second threshold, the minimum deceleration ratio is increased.

FIG. 8 is a diagram illustrating first threshold data including the first threshold. In FIG. 8, the horizontal axis represents the cylinder stroke from the cylinder stroke end when the movement starts, and the vertical axis represents the gain. As illustrated in FIG. 8, the first threshold of the cylinder stroke from the cylinder stroke end when the movement has started is set as the table data. The gain is a magnification for enlarging the deceleration section. When the cylinder stroke is larger than the first threshold, the gain is 1. That is, when the cylinder stroke is larger than the first threshold, the deceleration section is neither enlarged nor reduced, and the deceleration section of the restricted velocity data is maintained. On the other hand, when the cylinder stroke is equal to or less than the first threshold, the gain is larger than 1. In the present embodiment, the gain gradually increases from 1 at a first predetermined range in which the cylinder stroke from the cylinder stroke end when the movement has started includes the first threshold, the first predetermined range being smaller than the first threshold. Also, the gain can be set to an arbitrary value at a second predetermined range in which the cylinder stroke from the cylinder stroke end when the movement has started includes 0 [mm], the second predetermined range being larger than 0 [mm]. The offset may be provided instead of the gain. When the cylinder stroke is equal to or less than the first threshold, the deceleration section of the restricted velocity data is enlarged in accordance with the gain.

FIG. 9 is a diagram illustrating second threshold data including the second threshold. In FIG. 9, the horizontal axis represents the cylinder stroke from the cylinder stroke end when the movement starts, and the vertical axis represents the offset amount of the minimum deceleration ratio. As illustrated in FIG. 9, the second threshold of the cylinder stroke from the cylinder stroke end when the movement has started is set as the table data. The offset amount is the increased amount of when the minimum deceleration ratio is increased. When the cylinder stroke is larger than the second threshold, the offset amount is 0. That is, when the cylinder stroke is larger than the second threshold, the minimum deceleration ratio is neither increased nor decreased, and the minimum deceleration ratio of the restricted velocity data is maintained. On the other hand, when the cylinder stroke is equal to or less than the second threshold, the offset amount becomes larger than 0. In the present embodiment, the offset amount gradually increases from 0 in a third predetermined range in which the cylinder stroke from the cylinder stroke end when the movement has started includes the second threshold, the third predetermined range being smaller than the second threshold. Also, the offset amount can be set to an arbitrary value in a fourth predetermined range in which the cylinder stroke from the cylinder stroke end when the movement has started includes 0 [mm], the fourth predetermined range being larger than 0 [mm]. When the cylinder stroke is equal to or less than the second threshold, the minimum deceleration ratio of the restricted velocity data is increased in accordance with the offset amount.

Returning to FIG. 7, the setting unit 53 determines whether the cylinder stroke from the cylinder stroke end when the movement starts is equal to or less than the first threshold (step S50).

In step S50, when it is determined that the cylinder stroke from the cylinder stroke end when the movement has started is larger than the first threshold (step S50: No), the restricted velocity data is not changed (step S70).

The control unit 54 outputs a control signal to the control valve 45B so that the movement of the boom cylinder 23 is not restricted, and the boom cylinder 23 moves in accordance with the restricted velocity data (step S100). For example, the boom cylinder 23 moves as illustrated by an arrow Ya2 in FIG. 6.

In step S50, when it is determined that the cylinder stroke from the cylinder stroke end when the movement has started is equal to or less the first threshold (step S50: Yes), the setting unit 53 enlarges the deceleration section of the restricted velocity data (step S55). The setting unit 53 enlarges the deceleration section of the restricted velocity data according to the gain described with reference to FIG. 8.

The setting unit 53 determines whether the cylinder stroke from the cylinder stroke end when the movement starts is equal to less than the second threshold (step S60).

In step S30, when it is determined that the cylinder stroke from the cylinder stroke end when the movement has started is larger than the second threshold (step S60: No), that is, when it is determined that the cylinder stroke from the cylinder stroke end when the movement has started is larger than the second threshold and equal to or less than the first threshold, the control unit 54 outputs the control signal to the control valve 45B (step S100).

FIG. 10(A) indicates the restricted velocity data of the enlarged deceleration section, and FIG. 10(B) is a time chart of when the deceleration section is enlarged. FIG. 10(A) illustrates an example where the cylinder stroke from the cylinder stroke end when the movement has started (position of initial movement) is longer than the first deceleration distance. The position where the movement has started is the same as the stop position. As illustrated in FIG. 10(A), when the cylinder stroke from the cylinder stroke end when the movement starts is equal to or less than the first threshold, the restricted velocity data Lr1 having the enlarged deceleration section is set with respect to the deceleration section of the restricted velocity data Lr.

As described above, the deceleration section of the restricted velocity data Lr includes the first deceleration section and the second deceleration section. The first deceleration section is a section where the boom cylinder 23 is decelerated with the preset deceleration. The second deceleration section is a section where the boom cylinder 23 is moved to the cylinder stroke end at the constant minimum deceleration ratio. The setting unit 53 enlarges the deceleration section by enlarging the first deceleration section and the second deceleration section.

In the present embodiment, the restricted velocity data Lr includes an inflection point P1, an end point P2, and a straight line that connects the inflection point P1 and the end point P2. The setting unit 53 multiplies each of the values of the cylinder strokes of the inflection point P1 and the end point P2 by gain, and defines as an inflection point P1a and an end point P2a, respectively. Also, the setting unit 53 sets the restricted velocity data Lr1 by connecting the inflection point P1a and the end point P2a with a straight line.

The control unit 54 outputs the command signal to the control valve 45B so that the boom cylinder 23 moves in accordance with the restricted velocity data Lr1 with the enlarged deceleration section (step S100).

In FIG. 10(A), a line Ld3 indicates the cylinder velocity of the boom cylinder 23, which is based on the operation of the operation device 40. In the example illustrated in FIG. 10(A), the control unit 54 outputs the command signal to the control valve 45B in accordance with the deceleration ratio of the restricted velocity data. The control valve 45B is actuated to restrict the cylinder velocity of the boom cylinder 23 in the raising operation of the boom 13, based on the command signal from the control unit 54. In the present embodiment, the first deceleration section is shifted to be apart from the cylinder stroke end, and the timing at which the boom cylinder 23 starts the deceleration based on the command signal from the control unit 54 is advanced. Therefore, the cylinder velocity of the boom cylinder 23 is sufficiently decelerated. Accordingly, the boom cylinder 23 moves along the cylinder velocity profile indicated by the line Ld3 in FIG. 10(A), and reaches the stroke end at a time point T4 illustrated in FIG. 10(B). Also, the shock caused when reaching the cylinder stroke end is reduced.

A dotted line Ld3' in FIG. 10(A) indicates a cylinder velocity profile according to a comparative example, and a dotted line in FIG. 10(B) indicates a timing chart according to the comparative example. In the comparative example, the deceleration section is not enlarged, the boom cylinder 23 does not stop at the time point T4, and the shock caused when reaching the stroke end is not reduced.

Returning to FIG. 7, in step S60, when it is determined that the cylinder stroke from the cylinder stroke end when the movement has started is equal to or less than the second threshold (step S60: Yes), the setting unit 53 increases the minimum deceleration ratio (step S90). The setting unit 53 increases the minimum deceleration ratio of the restricted velocity data according to the offset amount described with reference to FIG. 9.

FIG. 11(A) indicates the restricted velocity data of the increased minimum deceleration ratio, and FIG. 11(B) is a time chart of when the minimum deceleration ratio is increased. FIG. 11(A) illustrates an example where the cylinder stroke from the cylinder stroke end when the movement has started (position of initial movement) is substantially the same as the second deceleration distance. As illustrated in FIG. 11(A), when the cylinder stroke from the cylinder stroke end when the movement starts is equal to or less than the second threshold, the restricted velocity data Lr2, having the minimum deceleration ratio additionally offset with a predetermined amount, is set with respect to the minimum deceleration ratio of the restricted velocity data Lr.

The control unit 54 outputs the command signal to the control valve 54 so that the boom cylinder 23 moves in accordance with the restricted velocity data Lr2 with the increased minimum deceleration ratio (step S100).

In FIG. 11(A), a line Ld4 indicates the cylinder velocity of the boom cylinder 23, which is based on the operation of the operation device 40. In the example of FIG. 11(A), the boom cylinder 23 starts moving from the position where the cylinder stroke starts moving, based on the operation of the operation device 40. The cylinder velocity of the boom cylinder 23, which is based on the operation of the operation device 40, changes, for example, as illustrated by the line Ld4 in FIG. 11(A). The boom cylinder 23, in a stopped state at the stop position at a predetermined distance from the cylinder stroke end, accelerates toward the cylinder stroke end based on the operation of the operation device 40. Moreover, the cylinder velocity of the boom cylinder 23, which is based on the operation of the operation device 40, increases from the deceleration ratio of the second deceleration section at a position Pd4 very close to the cylinder stroke end. Therefore, the cylinder stroke 23 is accelerated by the operation of the operation device 40. The boom cylinder 23 moves along the cylinder velocity profile indicated by the line Ld4 in FIG. 11(A). The cylinder velocity of the boom cylinder 23 is not excessively restricted, and thus, the boom cylinder 23 does not unnecessarily move slowly.

A dotted line Ld4' in FIG. 11(A) indicates a cylinder velocity profile according to a comparative example, and a dotted line in FIG. 11(B) indicates a timing chart according to the comparative example. In the comparative example, the minimum deceleration ratio is not increased, and thus, the boom cylinder 23 unnecessarily moves slowly.

In the present embodiment, when the control unit 54 outputs the control signal to the control valve 45B, a restricted value of the cylinder velocity is determined based on the maximum cylinder velocity, and the deceleration ratio obtained from the restricted velocity data. Table data that indicates the relationship between the spool stroke of the directional control valve 41 and the cylinder velocity is stored in the storage unit 61. The control unit 54 calculates a restricted value of the spool stroke based on such table data and determined cylinder velocity. Additionally, table data that indicates the relationship between the spool stroke and the pressure of the oil passage 44 (PPC pressure) where the pilot oil flows is stored in the storage unit 61. The control unit 54 calculates a restricted value of the PPC pressure based on such table data and calculated spool stroke. Furthermore, table data that indicates the relationship between the PPC pressure, and the current to be supplied to the control valve 45 to set to such PPC pressure is stored in the storage unit 61. The control unit 54 calculates a restricted value of the current based on such table data and calculated PPC pressure. These table data are known data derived by the experiments or simulation conducted in advance. The control unit 54 outputs the current as a command signal to the control valve 45. Then, the directional control valve 41 is driven so that the boom cylinder 23 moves at the determined cylinder velocity.

In these timing charts, the lever flag indicates the timing at which the operation device 40 has been operated in the operation signal acquisition unit 51, based on the detection of the pressure sensor 46. When the operation device 40 is operated, an operation signal (flag signal) is output from an operation signal output unit 49. On the other hand, when the operation of the operation device 40 is stopped, the lever flag is not output. The cylinder velocity is a cylinder velocity of the boom cylinder 23 which is detected by the boom posture detector 16. The cylinder stroke is the distance from the cylinder stroke end to the boom cylinder 23. The deceleration ratio is the restricted velocity (target velocity) of the cylinder velocity of the boom cylinder 23 that takes the maximum cylinder velocity as a reference. The cylinder stroke when the movement starts is the distance from the cylinder stroke end to the boom cylinder 23 when the boom cylinder 23 in the stopped state starts moving. The gain is a magnification for enlarging the deceleration section. The offset amount is the increased amount of the minimum deceleration ratio.

The operation device 40 is operated at the time point T1. The operation of the operation device 40 is stopped at the time point T2. The operation of the operation device 40 is resumed at the time point T3. In a case where the operation device 40 is operated at the time point T1, the boom cylinder 23 stops when the cylinder velocity is 0 [mm/s].

The cylinder stroke from the cylinder stroke end gradually shortens by operating the operation device 40, and driving the boom cylinder 23.

The time point T1 where the operation signal has been output from the operation signal output unit 49 is when the boom cylinder 23 starts moving. The cylinder stroke of the time point T1 is determined as the cylinder stroke from the cylinder stroke end when the movement has started, and is stored in the storage unit 61. In the example illustrated in FIG. 10, the cylinder stroke from the cylinder stroke end when the movement has started (time point T3) is a value close to the first threshold. In the example illustrated in FIG. 11, the cylinder stroke from the cylinder stroke end when the movement has started is a value close to the second threshold.

In the example illustrated in FIG. 10, the position where the movement has started, which is the cylinder stroke from the cylinder stroke end when the movement has started (time point T3), is compared with the first threshold and the second threshold. In the example illustrated in FIG. 10, the position where the movement has started is less than the first threshold. Therefore, the gain is set to a value larger than 1. The position where the movement has started is larger than the second threshold. Therefore, the offset amount is not set.

In FIG. 10, the deceleration ratio, indicated by a dotted line Da, indicates the deceleration ratio of when the deceleration section and the minimum deceleration ratio are not changed (deceleration ratio based on a deceleration table Lr) regardless of the cylinder stroke from the cylinder stroke end when the movement starts. The deceleration ratio, indicated by a solid line Sa, indicates the deceleration ratio of when the deceleration section is enlarged. By enlarging the deceleration section, as indicated by the solid line Sa (based on the deceleration table Lr1), the timing of the deceleration is advanced with respect to the deceleration ratio in which the deceleration section is not changed. Also, the cylinder velocity is set to Pd at the time point T4, and the deceleration by the deceleration table Lr1 starts.

In FIG. 11, the first threshold and the second threshold are set, and the cylinder stroke from the cylinder stroke end when the movement has started (time point T3) (position of the initial movement) is compared with the first threshold and the second threshold. In the example illustrated in FIG. 11, the position where the movement has started is less than the first threshold and the second threshold. The variable gain is set to a value larger than 1 and thus, the position of the initial movement becomes smaller than the second threshold at the time point T3. Therefore, the offset is set to the predetermined amount.

In FIG. 11, the deceleration ratio, indicated by a dotted line Da, indicates the deceleration ratio of when the deceleration section and the minimum deceleration ratio are not changed regardless of the cylinder stroke from the cylinder stroke end when the movement starts. The deceleration ratio, indicated by a solid line Sa, indicates the deceleration ratio of when the deceleration section is enlarged and the minimum deceleration ratio is increased. By enlarging the deceleration section and increasing the deceleration ratio, as indicated by the solid line Sa, the timing of deceleration is advanced, and the excessive reduction in the deceleration ratio of when restarting the movement (time point T3) is suppressed.

Effect

As described above, according to the present embodiment, the deceleration section including the upper end position of the movable range (cylinder stroke end) and the deceleration ratio of the boom 13 in the deceleration section are set based on the angle $\theta 13$ (cylinder stroke) in the stopped state at the stop position in the movable range of the boom 13 (boom cylinder 23), and a threshold determined in advance. The command signal is output to the control valve 45B so that the boom 13 (boom cylinder 23) moves from the stop position to the upper end position (cylinder stroke end) based on such deceleration section and deceleration ratio. The shock caused when the boom 13 reaches the upper end position is reduced, and the excessive-slow movement of the boom 13 is suppressed. Therefore, the reduction in working efficiency of the excavator 100 is suppressed.

In the present embodiment, as illustrated by the line Ld3 in FIG. 10 and the line Ld4 in FIG. 11, the movable range of the boom cylinder 23 between the cylinder stroke (stop position) from the cylinder stroke end when the movement starts and the cylinder stroke end (end position) includes an acceleration section and the deceleration section. The acceleration section includes the cylinder stroke from the cylinder stroke end when the movement starts, and the boom cylinder 23 moves, while accelerating at least in part of the acceleration section, based on the operation of the operation device 40. The deceleration section includes the cylinder stroke end, and the boom cylinder 23 moves, while decelerating, based on the command signal output by the control unit 54 in the deceleration section. In the acceleration section, the boom cylinder 23 (boom 13) operates based on the operation of the operation device 40, and therefore the unnecessary deceleration in the cylinder velocity of the boom cylinder 23 (moving velocity of the boom 13) is suppressed. Therefore, the reduction in working efficiency is suppressed. On the other hand, in the deceleration section, the boom cylinder 23 (boom 13) decelerates based on the control by the control unit 54, and therefore, the shock caused when the boom cylinder 23 reaches the cylinder stroke end and the boom 13 reaches the upper end position is reduced.

Additionally, in the present embodiment, when the cylinder stroke of the boom cylinder 23 (angle $\theta 13$ of the boom 13) in a stopped state is equal to or less than the first threshold, the deceleration section is enlarged. Therefore, even in a case where the boom cylinder 23 restarts moving from the stopped state, the shock caused when the boom cylinder 23 reaches the cylinder stroke end and the boom 13 reaches the upper end position is reduced.

Furthermore, in the present embodiment, the deceleration section includes the first deceleration section and the second deceleration section. The first deceleration section is a section where the boom cylinder 23 is decelerated at the preset deceleration. The second deceleration section is a section where the boom cylinder 23 is moved to the cylinder stroke end (upper end position) at the constant minimum deceleration ratio. The setting unit 53 enlarges the deceleration section by enlarging the second deceleration section without changing the first deceleration section. Accordingly, it is possible to reduce the shock by making the deceleration always constant when the boom cylinder 23 (boom 13) is decelerated.

Furthermore, in the present embodiment, when the cylinder stroke of the boom cylinder 23 (angle $\theta 13$ of the boom 13) in the stopped state is equal to or less than the second threshold, which is smaller than the first threshold, the minimum deceleration ratio is increased. Therefore, in the vicinity of the cylinder stroke end (upper end position), the unnecessarily slow movement of the boom cylinder 23 (boom 13) is suppressed and thus, the reduction in working efficiency is suppressed.

In the above-described embodiment, the work machine 100 has been the excavator 100. However, the control device 50 and the control method described in the above embodiment can be applied to any work machine, other than the excavator 100, that has a working unit.

In the above-described embodiment, the moving velocity of the boom 13 has been restricted in the vicinity of the upper end position when the boom 13 has been raised. However, the moving velocity of the boom 13 may be restricted in the vicinity of the bottom end position when the boom 13 is lowered, or the moving velocity of the arm in the vicinity of the stroke end may be restricted.

The excavator 100 described in the above embodiment is not limited to the rearward small-swinging type excavator.

REFERENCE SIGNS LIST

1 Working unit
2 Upper swing body
3 Lower traveling body
4 Swing base
5 Counterweight
6 Equipment room
7 Engine room
8 Cab
9 Crawler
10 Detection device
11 Bucket
12 Arm
13 Boom
14 Bucket posture detector
15 Arm posture detector
16 Boom posture detector
20 Hydraulic cylinder
20A Cap-side oil chamber
20B Rod-side oil chamber
21 Bucket cylinder
22 Arm cylinder
23 Boom cylinder
40 Operation device
41 Directional control valve
42 Main hydraulic pump
43 Pilot hydraulic pump
44A, 44B, 44C Oil passage
45A, 45B, 45C Control valve
46A, 46B Pressure sensor
47A, 47B Oil passage
48 Shuttle valve
50 Control device
51 Operation signal acquisition unit
52 Calculation unit
53 Setting unit
46
54 Control unit
61 Storage unit
62 Input/output unit
100 Excavator (work machine)
200 Control system
300 Hydraulic system
AX1 Rotation axis
AX2 Rotation axis
AX3 Rotation axis
RX Swing axis
$\theta 11$ Angle
$\theta 12$ Angle
$\theta 13$ Angle

The invention claimed is:
1. A work machine comprising:
a hydraulic cylinder that drives a working unit in a movable range;
a detection device that detects a posture of the working unit;

a control valve configured to adjusting an amount of a working oil supplied to the hydraulic cylinder;

a control device includes a computer system, configured to detect an operation signal when the working unit is operated;

to determine whether the working unit at a stop position in the movable range has started moving based on the operation signal;

to set a deceleration section including an end position of the movable range and a deceleration ratio of the working unit in the deceleration section, based on the posture of the working unit in a stopped state at the stop position, and a threshold determined in accordance with the posture of the working unit in the stopped state at the stop position; and to output a command signal to the control valve such that the working unit moves from the stop position to the end position based on the deceleration section and the deceleration ratio.

2. The work machine according to claim 1, comprising an operation device that operates the hydraulic cylinder, wherein the movable range between the stop position and the end position includes:

a section that includes the stop position, and where the working unit moves based on the operation of the operation device; and the deceleration section that includes the end position, and where the working unit moves based on the command signal output by the control device.

3. The work machine according to claim 1, wherein the posture of the working unit includes an angle of the working unit, the threshold includes a first threshold and a second threshold smaller than the first threshold, and the control device enlarges the deceleration section when the angle of the working unit in the stopped state is equal to or less than the first threshold.

4. The work machine according to claim 3, wherein the deceleration section includes a first deceleration section where the working unit is decelerated with a predetermined deceleration, and a second deceleration section where the working unit is moved to the end position at a constant minimum deceleration ratio, and the control device enlarges the deceleration section by enlarging the second deceleration section without changing the first deceleration section.

5. The work machine according to claim 3, wherein the control device increases a minimum deceleration ratio when the angle of the working unit in the stopped state is equal to or less than the second threshold.

6. The work machine according to claim 1, wherein the end position is an upper end position when the working unit is raised.

7. The work machine according to claim 1, which is a rearward small-swinging type excavator that includes a lower traveling body and an upper swing body, wherein a counterweight arranged at a rear portion of the upper swing body is defined in a predetermined dimension related to a swinging radius of the upper swing body.

8. A control method for a work machine, comprising:

detecting a posture of a working unit driven by a hydraulic cylinder in a movable range;

determining whether the working unit at a stop position of the movable range has started moving based on an operation of the working unit;

setting a deceleration section including an end position of the movable range and a deceleration ratio of the working unit in the deceleration section, based on the posture of the working unit in a stopped state at the stop position, and a threshold determined in accordance with the posture of the working unit in the stopped state at the stop position; and outputting a command signal to a control valve, which is configured to adjusting an amount of a working oil supplied to the hydraulic cylinder, such that the working unit moves from the stop position to the end position based on the deceleration section and the deceleration ratio.

\* \* \* \* \*